(12) United States Patent
Kleyman et al.

(10) Patent No.: US 11,708,195 B2
(45) Date of Patent: *Jul. 25, 2023

| | | |
|---|---|---|
| (54) | INTEGRATED SQUEEZABLE CONTAINERS AND MANUFACTURE THEREOF | |
| (71) | Applicant: Klecher, LLC, Brooklyn, NY (US) | |
| (72) | Inventors: Gennady I. Kleyman, Brooklyn, NY (US); Yuriy Chernov, Brooklyn, NY (US) | |
| (73) | Assignee: KLECHER, LLC, Brooklyn, NY (US) | |
| ( * ) | Notice: | Subject to any disclaimer, the term of this patent is extended or adjusted under 35 U.S.C. 154(b) by 0 days. |
| | | This patent is subject to a terminal disclaimer. |
| (21) | Appl. No.: 17/384,965 | |
| (22) | Filed: Jul. 26, 2021 | |
| (65) | Prior Publication Data | |
| | US 2021/0347531 A1 Nov. 11, 2021 | |

Related U.S. Application Data

(63) Continuation of application No. 17/027,459, filed on Sep. 21, 2020, now Pat. No. 11,072,467.
(Continued)

(51) Int. Cl.
  *B23K 9/00* (2006.01)
  *B23K 20/10* (2006.01)
  (Continued)
(52) U.S. Cl.
  CPC ............... *B65D 35/28* (2013.01); *B23K 9/00* (2013.01); *B23K 20/10* (2013.01); *B29C 65/08* (2013.01)
(58) Field of Classification Search
  CPC .. B65D 35/28; B23K 9/00; B23K 20/10–106; B23K 37/04–0538; B29C 65/08
  See application file for complete search history.

(56) References Cited

U.S. PATENT DOCUMENTS

| | | | | | |
|---|---|---|---|---|---|
| 967,163 | A | * | 8/1910 | Blaw | B29C 45/16 264/261 |
| 1,952,319 | A | * | 3/1934 | Hull | B23K 9/0253 219/60 R |

(Continued)

FOREIGN PATENT DOCUMENTS

| | | | | | |
|---|---|---|---|---|---|
| CN | 87106852 | A | * | 5/1988 | ............. B29C 53/50 |
| CN | 111515567 | B | * | 3/2022 | ............. B23K 31/02 |

(Continued)

OTHER PUBLICATIONS

International Search Report and Written Opinion in PCT/US2020/051860 dated Dec. 16, 2020.
(Continued)

*Primary Examiner* — Kiley S Stoner
(74) *Attorney, Agent, or Firm* — Haley Guiliano LLP

(57) ABSTRACT

Systems and methods are presented herein for a method of attaching a strip to a housing. An internal support member is inserted into a collapsible housing, such that it is arranged along a longitudinal axis of an inner surface of the collapsible housing. An outer support member is arranged along an outer surface the collapsible housing opposite the internal support member. A strip is positioned along the outer surface using the outer support member and the internal support member. Then the strip is permanently welded to the outer surface using a welding element. Welding is performed by a welding element located in one (or both) of the internal support member or the outer support member.

8 Claims, 17 Drawing Sheets

Related U.S. Application Data

(60) Provisional application No. 62/903,336, filed on Sep. 20, 2019.

(51) Int. Cl.
  *B65D 35/28* (2006.01)
  *B29C 65/08* (2006.01)

(56) References Cited

U.S. PATENT DOCUMENTS

| | | | | |
|---|---|---|---|---|
| 2,216,606 | A * | 10/1940 | Hall | B21C 37/122 228/168 |
| 2,233,233 | A * | 2/1941 | Williams | B21C 37/122 219/62 |
| 2,298,249 | A * | 10/1942 | Brown, Jr. | B23K 11/0046 219/81 |
| 2,298,250 | A * | 10/1942 | Brown, Jr. | B23K 11/0046 219/107 |
| 2,390,855 | A * | 12/1945 | Thompson | B23K 11/0046 228/30 |
| 2,449,840 | A * | 9/1948 | Brown, Jr. | B21C 37/225 219/81 |
| 2,473,633 | A * | 6/1949 | Brown, Jr. | B23K 11/0046 219/107 |
| 2,716,276 | A * | 8/1955 | Brown, Jr. | B21C 37/225 228/232 |
| 2,803,730 | A | 8/1957 | Kinghorn | |
| 2,825,159 | A | 3/1958 | Milton | |
| 2,826,672 | A * | 3/1958 | Brown, Jr. | B23K 11/0046 219/81 |
| 2,965,744 | A * | 12/1960 | Busse | B23K 11/084 29/890.048 |
| 3,020,027 | A * | 2/1962 | Dumpleton | F28F 1/12 165/181 |
| 3,047,712 | A * | 7/1962 | Morris | B21C 37/26 165/184 |
| 3,060,653 | A | 10/1962 | Flax | |
| 3,118,045 | A * | 1/1964 | Kohler | B23K 13/046 219/60 A |
| 3,120,138 | A * | 2/1964 | Ronay | B23K 11/04 228/44.5 |
| 3,397,440 | A * | 8/1968 | Dalin | F28F 1/122 228/183 |
| 3,427,427 | A * | 2/1969 | Rudd | B23K 11/084 228/183 |
| 3,525,139 | A | 8/1970 | Fournier | |
| 3,621,178 | A * | 11/1971 | Nakayama | B21C 37/26 219/57 |
| 3,740,306 | A | 6/1973 | Kosbab et al. | |
| 3,741,457 | A * | 6/1973 | Gwin | B23K 37/0531 228/44.5 |
| 3,927,292 | A | 12/1975 | Worden | |
| 3,929,270 | A | 12/1975 | Keith | |
| 4,046,301 | A | 9/1977 | Wittman et al. | |
| 4,201,326 | A * | 5/1980 | Connell | B23K 9/035 219/160 |
| 4,430,146 | A | 2/1984 | Johnson | |
| 4,521,767 | A | 6/1985 | Bridge | |
| 4,690,668 | A * | 9/1987 | Rebmann | B29C 65/5042 493/193 |
| 5,032,448 | A | 7/1991 | Mendenhall | |
| 5,285,947 | A * | 2/1994 | Depperman | B23K 37/0531 269/48.1 |
| 5,288,005 | A * | 2/1994 | Beakley | B23K 37/0531 228/49.3 |
| 5,451,741 | A | 9/1995 | Doronin et al. | |
| 5,453,149 | A | 9/1995 | Szczesniak | |
| 5,505,813 | A * | 4/1996 | Scheifele | B29C 66/8181 156/438 |
| 5,535,938 | A * | 7/1996 | Leduc | B23K 37/0531 228/49.3 |
| 5,691,051 | A | 11/1997 | Matthews | |
| 6,016,948 | A * | 1/2000 | Kurotobi | B23K 9/0026 219/137.9 |
| 6,063,223 | A | 5/2000 | Klauke et al. | |
| 6,119,916 | A * | 9/2000 | Anderson | B23K 37/0531 228/44.5 |
| 6,328,922 | B1 * | 12/2001 | Mishra | B29C 66/8161 156/137 |
| 6,398,100 | B1 * | 6/2002 | Radbourne | B23K 37/0531 228/44.5 |
| 8,916,247 | B2 | 12/2014 | Thomasset | |
| 10,377,533 | B2 | 8/2019 | Kleyman et al. | |
| 2001/0039994 | A1 | 11/2001 | Yu et al. | |
| 2006/0071054 | A1 * | 4/2006 | Bolser | B23K 20/10 228/124.6 |
| 2007/0292647 | A1 | 12/2007 | Princell | |
| 2010/0051672 | A1 * | 3/2010 | Nunnery | B23K 37/0531 228/44.5 |
| 2011/0127313 | A1 * | 6/2011 | Rainer | E04H 12/2223 228/101 |
| 2014/0091128 | A1 * | 4/2014 | Vanderpol | B23K 9/16 228/44.5 |
| 2017/0349334 | A1 | 12/2017 | Kleyman et al. | |
| 2018/0155090 | A1 | 6/2018 | Kleyman et al. | |
| 2019/0240736 | A1 * | 8/2019 | Freidhoff | B23C 3/007 |
| 2020/0102123 | A1 | 4/2020 | Chernov et al. | |

FOREIGN PATENT DOCUMENTS

| | | | |
|---|---|---|---|
| DE | 10250741 | | 5/2004 |
| EP | 0095082 | | 11/1983 |
| FI | 82543 | B * | 11/1990 |
| GB | 554813 | A * | 7/1943 |
| JP | 60145286 | A * | 7/1985 | B23K 9/0026 |

OTHER PUBLICATIONS

The Tube Council, Tube Sealing, https://web.archive.org/web/20190327061300/http://tube.org/tube-sealing/, Mar. 27, 2019, 3 Pages.
Machine Translation of DE-10250741-A1.

* cited by examiner

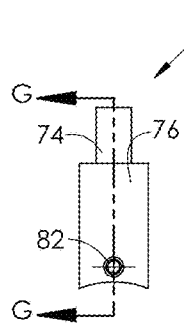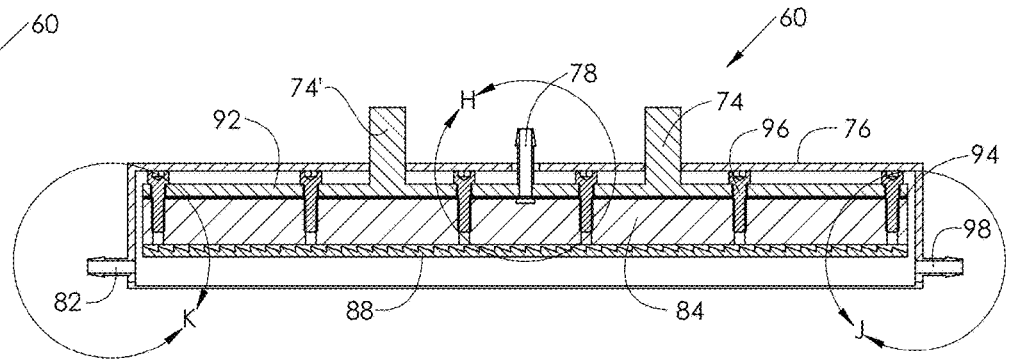
FIG. 37    FIG. 38
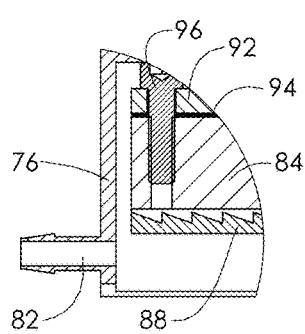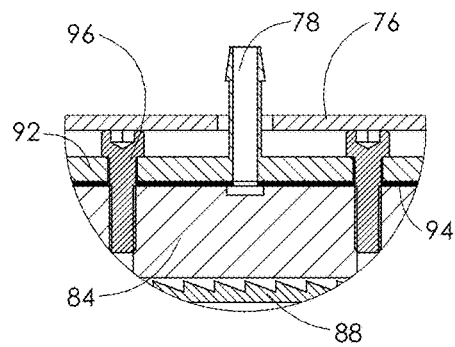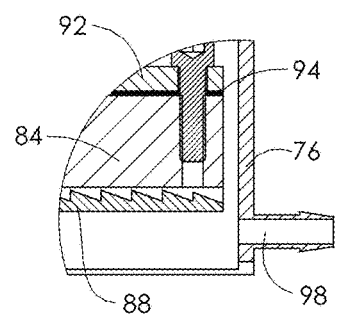
FIG. 39    FIG. 40    FIG. 41
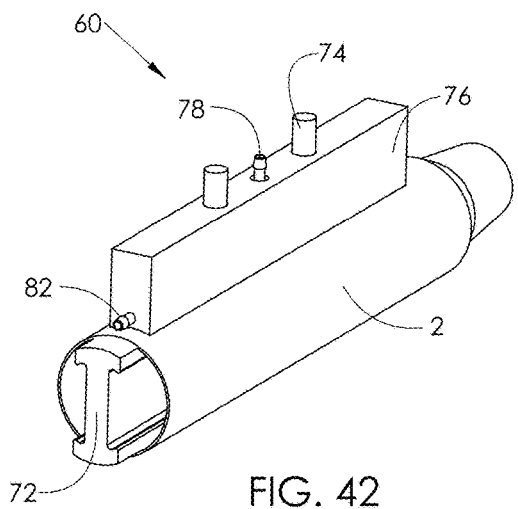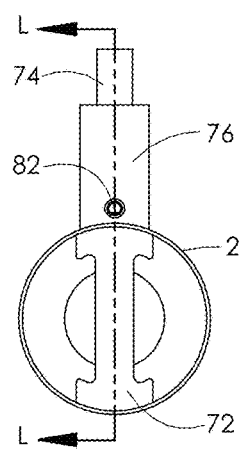
FIG. 42    FIG. 43

INTEGRATED SQUEEZABLE CONTAINERS AND MANUFACTURE THEREOF

CROSS REFERENCE TO RELATED APPLICATIONS

This application is a continuation of U.S. patent application Ser. No. 17/027,459, filed Sep. 21, 2020, which claims the benefit of U.S. Provisional Patent Application No. 62/903,336 filed on Sep. 20, 2019, each of which are incorporated herein by reference in their entirety.

FIELD OF THE DISCLOSURE

This disclosure is directed to containers and systems and methods for manufacturing such containers. A container of the present disclosure includes one or more strips along which one or more pushers that engage with the container can move in order to cause the contents of the container to be extruded.

BACKGROUND OF THE INVENTION

Deformable material dispensing containers commonly are composed of a tubular or other shaped housing having an opening at one end and being sealed at the other end. Such containers may house material that can be displaced through the opening when the material dispenser (e.g., a tube) is deformed, such as by squeezing, which temporarily diminishes the volume of the housings to force the contained included material out through the opening. However, owing to the housing material and/or geometrical configuration, the housing tends to return to the original configuration or volume, delaying or interfering with subsequent dispensing of the included material. Additionally, during a squeezing action, some portion of materials may be displaced in a direction away from the opening, which creates a necessity to make a more refined or controlled squeezing action necessary to push those materials to the tube opening.

792882_2

SUMMARY

A container manufacturing system may include an internal support member configured to be inserted into a collapsible housing (e.g., tube-shaped housing). The internal support member may be arranged along a longitudinal axis of an inner surface of the collapsible housing. The system may also include an outer support member arranged along an outer surface of the collapsible housing opposite the internal support member. The outer support member and the internal support member, together, may be configured to position a strip (e.g., a single material or multi-material strap) along the outer surface of the collapsible housing. Further, the outer support member, the internal support member, or both may include at least one welding element configured to permanently weld the strip to the outer surface of the housing.

For example, the strip may be welded to the collapsible housing by the welding element while the outer support member and the internal support member position the strip by, for example, applying pressure on the strip from opposite sides of the strip. For example, the outer support member and the internal support member may apply opposing forces (e.g., provided by gravity, mechanical press, or pneumatic press) to hold the strip against the housing while the welding process takes place. In some embodiments, the outer support member holds and positions the strip. In some embodiments, the internal support member may be an elongated anvil having two curved surfaces that match the shape of the collapsible housing when it is in its fully un-collapsed state (e.g., in a shape of a tube). In some embodiments, the internal support member may be of any other suitable shape (e.g., it may fully or partially match the size and shape of the internal cavity of the collapsible housing as to keep it from collapsing).

In some embodiments, ultrasonic sealing techniques may be used to weld the strip to the collapsible housing. For example, the welding element may be positioned in the outer support member. In such embodiments, the welding element is configured to permanently weld the strip to the outer surface using high-frequency vibrations.

In some embodiments, hot jaw sealing techniques may be used to weld the strip to the collapsible housing. For example, the welding element may include heating elements positioned in the outer support member and heating elements positioned in the internal support member. In such embodiments, the welding elements are configured to permanently weld the strip to the outer surface of the collapsible container by using the heating element or elements to partially melt the strip and the wall of the housing.

In some embodiments, high-frequency sealing techniques may be used to weld the strip to the collapsible housing. For example, the welding element may include electricity-providing elements positioned in the outer support member and/or in internal support elements. In such embodiments, the welding element is configured to permanently weld the strip to the outer surface of the collapsible container by using a high-frequency alternating current provided by the welding element to provide current to a conductive (e.g., a metal foil) layer inside a strip and/or inside a wall of the housing to melt surrounding material of the strip or the housing.

In some embodiments, hot air sealing techniques may be used to weld the strip to the collapsible housing. For example, the welding element may be located in the outer support member and an air pathway for high-temperature air can be used to deliver the hot air. In such embodiments, the welding element is configured to permanently weld the strip to the outer surface of the collapsible container by using the high-temperature air circulating in or otherwise delivered by the air pathway. For example, the strip may be held slightly away from the surface of the housing while hot air circulates in the welding element between the strip and outer surface of the housing. After sufficient temperature is achieved, the strip is lowered to the housing.

Methods for welding the strip to the collapsible housing (e.g., to manufacture the container) are also provided. In some embodiments, an internal support member is inserted into a collapsible housing such that it is arranged along a longitudinal axis of an inner surface of the collapsible housing. In some embodiments, the internal support member prevents the collapsible housing from fully or partially collapsing during the welding process. The outer support is also arranged along an outer surface of the collapsible housing opposite the internal support member. The outer support may be positioned either manually or using any suitable device configured to place support members (e.g., a mechanical arm or a press). The strip (that is to be welded) may be positioned along the outer surface using the outer support member and the internal support member. For example, the internal support member may be used to hold the collapsible housing in a steady and un-collapsed state while the outer support member may be used to position the strip along the outer surface of the collapsible housing. Once the strip is positioned, the welding element (contained within one or both of the internal support member and the outer support member) may be activated to permanently weld the strip to the outer surface.

Any suitable technique may be used to achieve the welding, including ultrasonic sealing, hot jaw sealing, high-frequency sealing, and hot air sealing, as described above and below.

Also provided are multi-housing containers, for example, where collapsible containers (e.g., tube-shaped containers) are nested, connected side by side, or both. In some embodiments, two collapsible containers (e.g., tubes) may be nested inside one another. A strip may be attached (e.g., by permanent welding or using permanent or temporary adhesives) to the outer surface of the outer container. The strip may act as a guide for a pusher configured to selectively collapse both inner and outer nested collapsible containers. In such embodiments, a pusher may be provided with an aperture through which both nested containers and the strip are inserted. The aperture may have a shape that is wider in the middle and flatter to both sides. Such a shape, advantageously, allows both widths of both nested containers to pass through the middle while causing a flatter portion of the aperture to collapse the portions of the outer container that do not align with portions of the inner container and causing the wider portion of the aperture to collapse the portions of the outer container aligned with portions of the inner container.

In some embodiments, two collapsible containers may be positioned side by side. For example, the two collapsible containers may be welded or glued together along a length of their respective outer surfaces. A strip may be attached (e.g., by permanent or temporary welding or adhesives) to the outer surface of one of the containers. The strip may act as a guide for a pusher configured to selectively collapse both collapsible containers. In such embodiments, a pusher may be provided with an aperture through which both containers and the strip may be inserted.

BRIEF DESCRIPTION OF THE DRAWINGS

The above and other objects and advantages of the disclosure will be apparent upon consideration of the following detailed description, taken in conjunction with the accompanying drawings, in which:

FIG. 37 is a front view of an outer support member of FIG. 36;

FIG. 38 is a side cutaway view of an outer support member of FIG. 36;

FIG. 39 is a partial enlarged view of FIG. 38;

FIG. 40 is another partial enlarged view of FIG. 38;

FIG. 41 is another partial enlarged view of FIG. 38;

FIG. 42 is a perspective view of a housing, strip, internal support member, and outer support member, in which the internal support member and the outer support member position the strip above the outer surface of the housing, according to some embodiments of the present disclosure;

FIG. 43 is a front view of FIG. 42;

DETAILED DESCRIPTION

Figure 1:
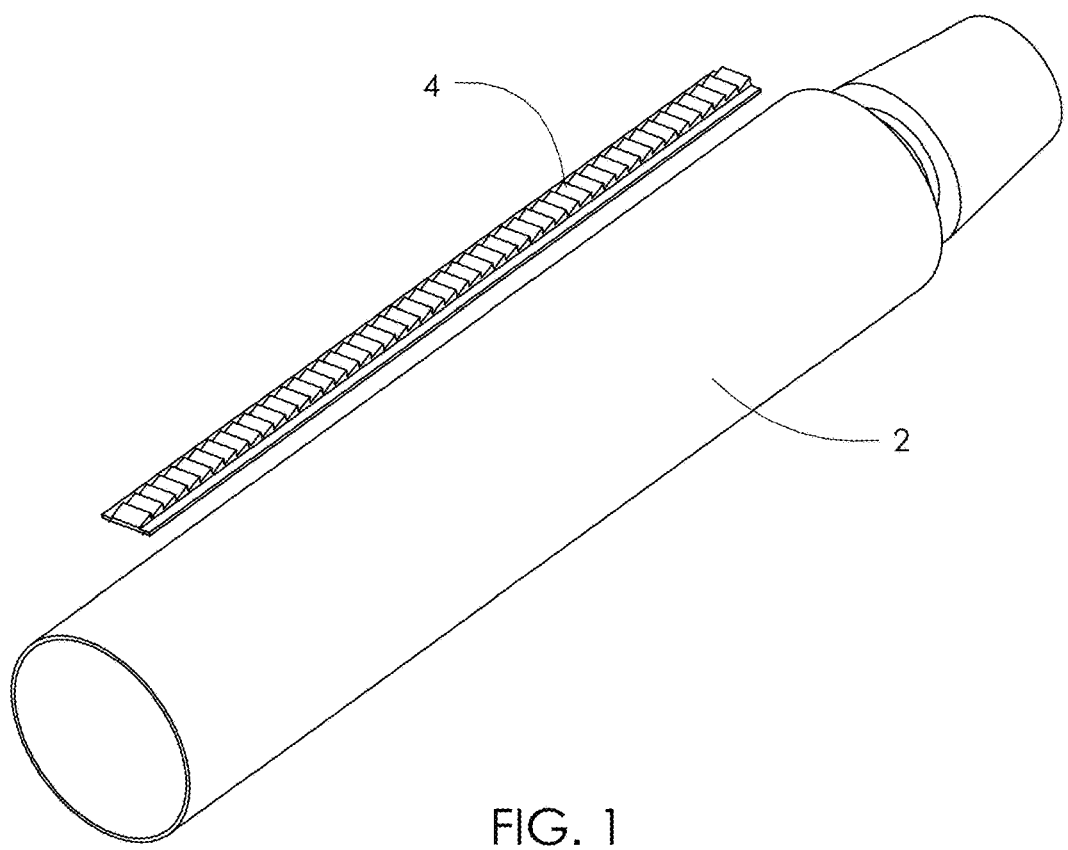
FIG. 1 is an exploded perspective view of a housing and an unattached strip, according to some embodiments of the present disclosure.
Figure 2:
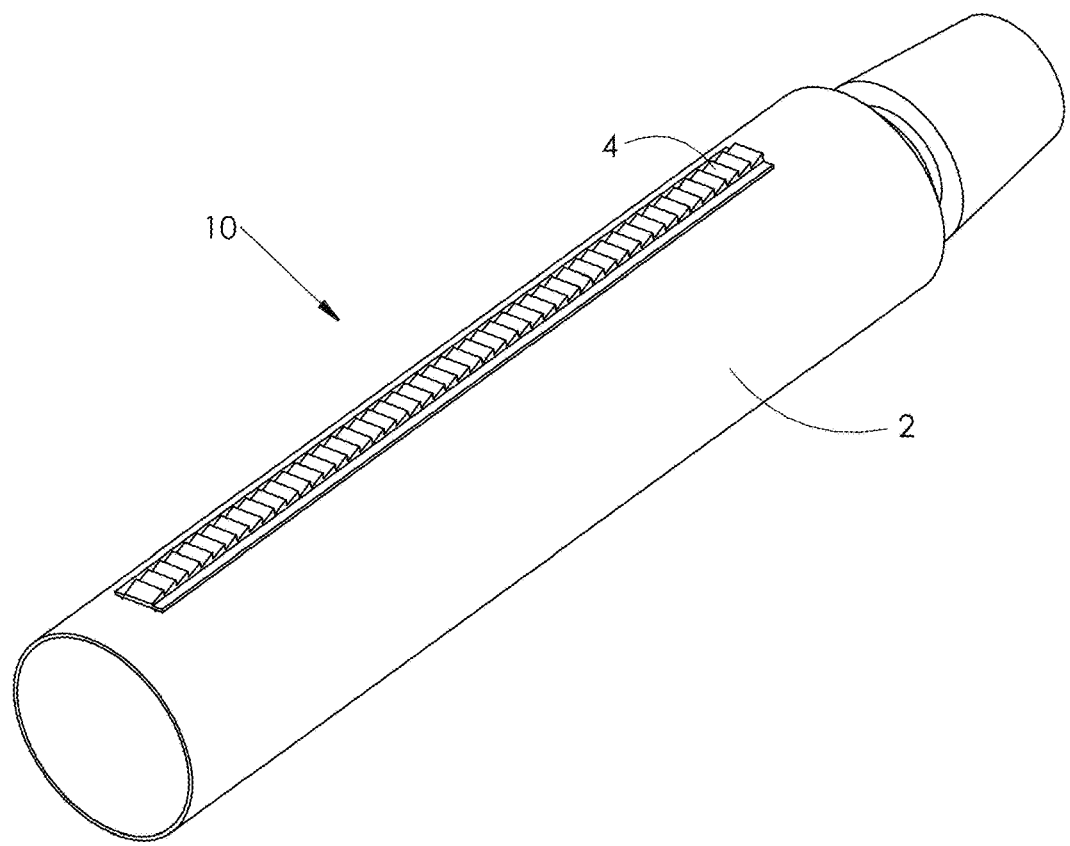
FIG. 2 is a perspective view of an assembled container with aa strip attached to a housing according to some embodiments of the present disclosure.

FIG. 1 and FIG. 2 depict a collapsible housing 2 (e.g., of a container) and a strip 4 that can be detachably or permanently connected (e.g., by welding or permanent or detachable glue). While a tubular housing is depicted, it will be understood that any other suitable shape of housing may be used. FIG. 1 shows a view where strip 4 is disconnected from housing 2. FIG. 2 shows a view where strip 4 is connected to housing 2. In some embodiments, the connection may be accomplished using any of the embodiments described above or below, e.g., using methods and systems depicted in FIGS. 3-61.

In some embodiments, strip 4 may be composed of any one or more of laminate, plastic, metal, laminate with or without conductive layers (e.g., a foil layer), or any other suitable material or combination of materials (e.g., layers of materials). Housing 2 may be composed of any one or more of laminate, plastic, metal, laminate with or without a conductive layer (e.g., a foil layer), or any other suitable material or combination of materials (e.g., layers of materials). In some embodiments, housing 2 may be deformable or collapsible (e.g., in a way to squeeze out material stored inside of housing 2). In some embodiments, housing 2 may be elongated. Strip 4 may be attached to an outer surface of housing 2 in the direction of the elongation (i.e., along the longitudinal axis of housing 2).

1. Ultrasonic Sealing

FIGS. 3-9 depict a system (e.g., system 20) for connecting strip 4 to housing 2 using ultrasonic sealing to create a permanent weld between the lower surface of strip 4 and the outer surface of housing 2.

Figure 3:
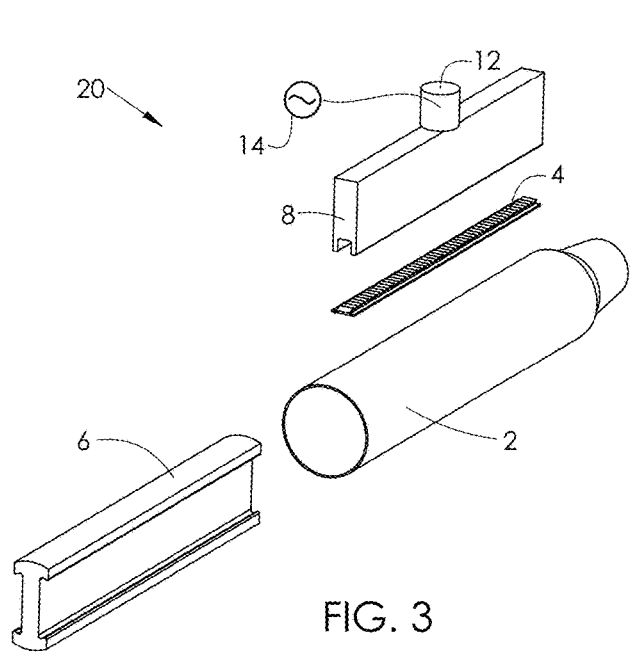
FIG. 3 is an exploded perspective view of a housing, strip, internal support member, and outer support member, according to some embodiments of the present disclosure.

FIG. 3 shows an exploded view of system 20 including internal support member 6, and an outer support member (which may include ultrasonic horn 8 and energy source 12 attached to ultrasonic sealing horn 8), which are configured to permanently weld strip 4 (e.g., teethed strip) to housing 2.

Figure 4:
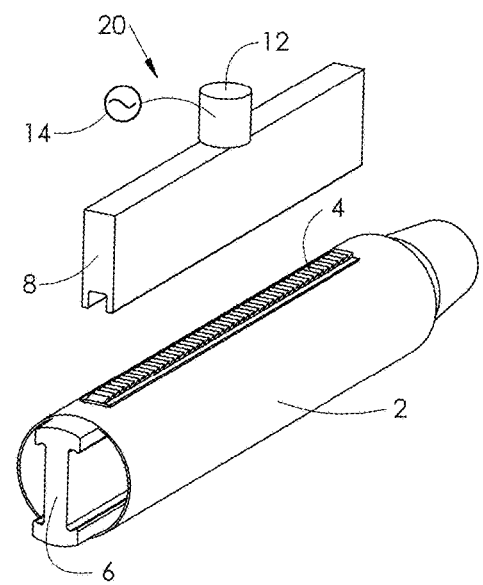
FIG. 4 is a perspective view of a housing, strip, internal support member, and outer support member, according to some embodiments of the present disclosure where the internal support member is inserted into the housing.

In some embodiments, housing 2 may be extruded or laminated. In some embodiments, the material of strip 4 may have a melting temperature close to the melting temperature of the material of housing 2. FIG. 4 shows internal support member 6 inserted into housing 2 to keep it in an un-collapsed state.

In some embodiments, the outer support member includes a welding element that includes ultrasonic horn 8 and energy source 12 attached to ultrasonic horn 8, in which the ultrasonic horn provides ultrasonic vibrations when energy source 12 is active. Energy source 12 may be a transducer or any other wired or wireless source or conduit of electric energy (e.g., energy sources 14). In some embodiments, electric energy 14 may be connected to another energy source by at least one wire or circuitry connected to a power grid, a battery, a generator, or any other electrical power source. In some embodiments, electrical energy 14 may be provided by induction.

Figure 5:
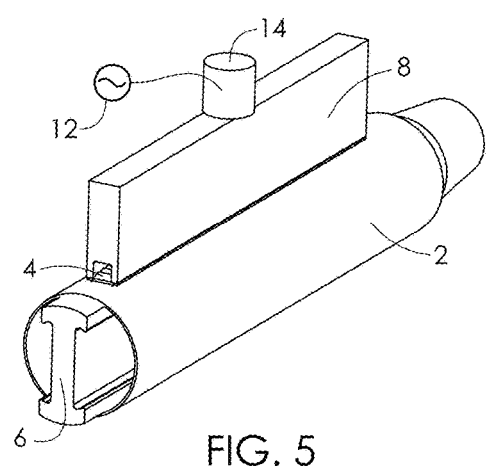
FIG. 5 is a perspective view of a housing, strip, internal support member, and outer support member, in which the internal support member and the outer support member position the strip along the outer surface of the housing, according to some embodiments of the present disclosure.
Figure 6:
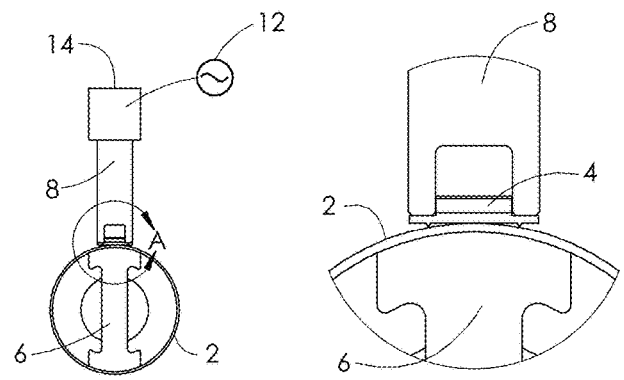
FIG. 6 is a front view of FIG. 5.
Figure 7:
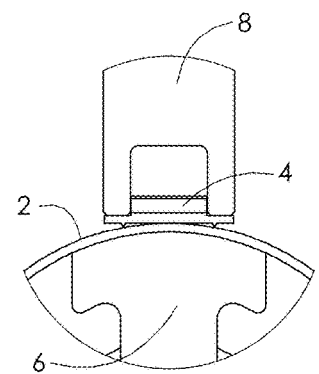
FIG. 7 is an enlarged portion of the front view of FIG. 6.
Figure 8:
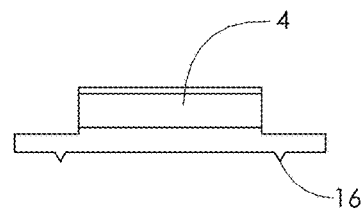
FIG. 8 is a front view of the strip, according to some embodiments of the present disclosure.
Figure 9:
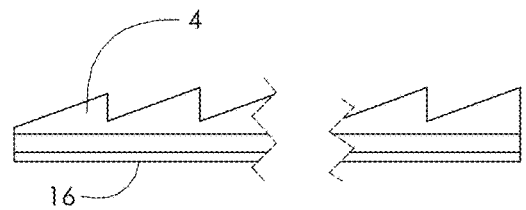
FIG. 9 is a side view of the strip, according to some embodiments of the present disclosure.

FIGS. 5-6 show perspective, front, and enlarged views of system 20 (e.g., in the process of welding strip 4 to housing 2). FIG. 7 shows an enlarged view of area A in FIG. 6. As shown, internal support member 6 may be shaped in a form of an elongated anvil, with the outer surfaces of the anvil at least matching the shape of housing 2 in its un-collapsed form. In some embodiments, other elongated shapes of internal support member 6 may be used, to prevent housing 2 from collapsing during welding operations.

In some embodiments, internal support member 6 may be inserted into housing 2. Then strip 4 may be oriented to housing 2, as shown in FIGS. 4-7, by ultrasonic sealing horn 8 (which is connected to the source of the high-frequency vibration 14) and positioned opposite of internal support member 6. In particular, internal support member 6 and ultrasonic sealing horn 8 may apply pressure to the strip 4 to hold it in place alongside housing 2 during activation of power sources 14, which results in the transfer of energy to source 12 which in turn transfers energy to horn 8, which provides ultrasonic vibrations to strip 4 and/or housing 2.

In some embodiments, strip 4 may include energy director extensions 16 (e.g., made of the same material as strip 4 or a different material from the rest of strip 4) to better conduct ultrasonic vibrations from horn 8. High-frequency vibrations may be generated by element 12 when it's powered (e.g., by power sources 14) and transferred to energy director extensions 16. In some embodiments energy director extensions 16 may have a prism shape, which is elongated along the length of strip 4.

Together, internal support member 6 and ultrasonic sealing horn 8 may apply pressure to hold strip 4 and housing 2 in place while high-frequency vibrations are applied via ultrasonic sealing horn 8 resulting in a permanent weld developing between strip 4 and housing 2 (e.g., due to the vibrations partially melting the outer surface of housing 2 and the lower surface of strip 4 and subsequent re-solidification).

2. Hot Jaw Sealing

FIGS. 10-20 depict methods and system (e.g., system 30) for connecting strip 18 to housing 2 using heat to create a permanent weld between an outer surface of strip 18 and housing 2. In some embodiments, strip 18 becomes permanently attached to the housing 2 surface by operation of a welding element contained in the outer support member that includes compression member 22 and heating elements 24 connected to compression member 22 and powered by electrical energy source 23. In some embodiments, heating elements 22 may partially melt the outer surface of housing 2 and the lower surface of strip 18, resulting in a permanent weld after re-solidification. In some embodiments, the internal support member 26 (e.g., an elongated anvil) may additionally or alternatively include a welding element comprising heating element 28 that may be powered by electrical source 34 and is configured to partially melt the outer surface of housing 2 and the lower surface of strip 18 resulting in a permanent weld after re-solidification.

Figure 10:
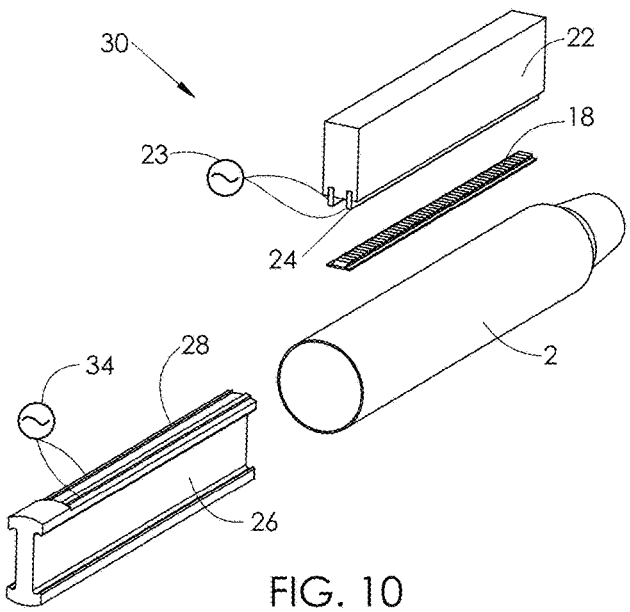
FIG. 10 is an exploded perspective view of a housing, strip, internal support member, and outer support member, according to some embodiments of the present disclosure.
Figure 11:
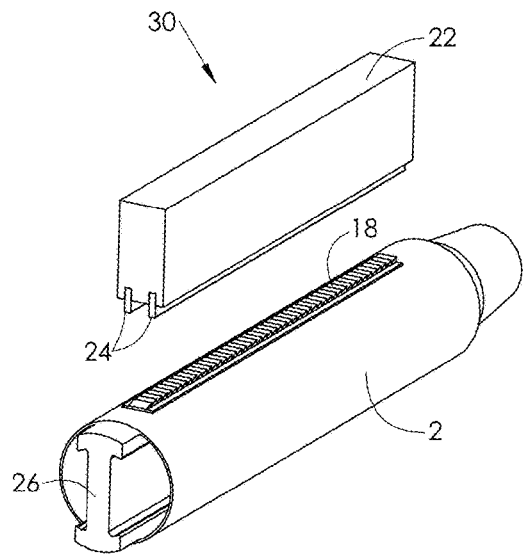
FIG. 11 is a perspective view of a housing, strip, internal support member, and outer support member, according to some embodiments of the present disclosure, where the internal support member is inserted into the housing.

FIG. 10 shows an exploded view of system 30 for hot jaw welding including an outer support member (which may include compression member 22), and internal support member 26 that is configured to permanently weld strip 18 (e.g., teethed strip) to housing 2. In some embodiments, the housing may be extruded or laminated. In some embodiments, the material of strip 4 may have a melting temperature close to the melting temperature of the material of housing 2. FIG. 11 shows internal support member 26 inserted into housing 2 to keep it in an un-collapsed state.

In some embodiments, the outer support member includes a welding element that includes heating elements 24 connected to electrical energy source 23. Energy source 23 may be a transducer or any other wired or wireless source or conduit of electrical energy. In some embodiments, electrical energy may be provided to energy source 23 by at least one wire or circuitry connected to a power grid, a battery, a generator, or any other electrical power source.

In some embodiments, internal support member 26 includes a welding element that includes heating element 28 connected to electrical energy source 34. Energy source 34 may be a transducer or any other wired or wireless source or conduit of electrical energy. In some embodiments, electrical energy may be provided to energy source 34 by at least one wire or circuitry connected to a power grid, to a battery, a generator, or any other electrical power source.

Figure 12:
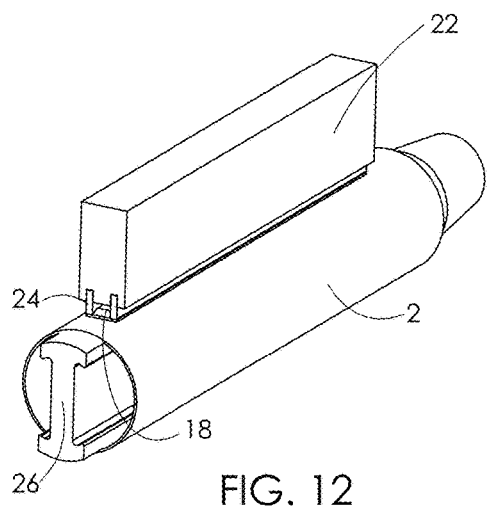
FIG. 12 is a perspective view of a housing, strip, internal support member, and outer support member in which the internal support member and the outer support member position the strip along the outer surface of the housing, according to some embodiments of the present disclosure.
Figure 13:
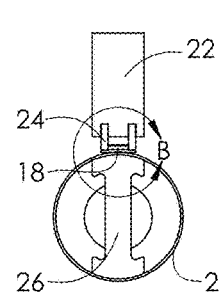
FIG. 13 is a front view of FIG. 12.
Figure 14:
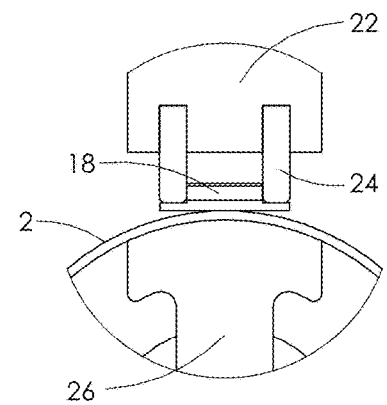
FIG. 14 is an enlarged portion of the front view of FIG. 13.
Figure 15:
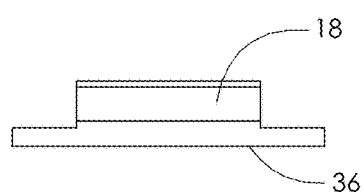
FIG. 15 is a front view of the strip, according to some embodiments of the present disclosure.
Figure 16:
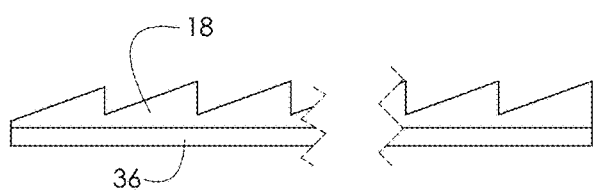
FIG. 16 is a side view of the strip, according to some embodiments of the present disclosure.

FIGS. 12-14 show perspective, front, and enlarged views of a system 30, for example system 30 (e.g., in process of welding strip 18 to housing 2). FIG. 14 shows an enlarged view of area B in FIG. 13. As shown, internal support member 26, may be shaped like an elongated anvil with an outer surface matching the shape of housing 2 in its un-collapsed form. In some embodiments, other elongated shapes of internal support member 26 may be used to prevent housing 2 from collapsing during welding operations.

In some embodiments, internal support member 26 may be inserted into housing 2. Then strip 18 may be oriented to housing 2, as showing FIGS. 12-14, by compression member 22. In particular, internal support member 26 and by compression member 22 may apply pressure to the strip 18 to hold it in place alongside housing 2 during activation of power sources 23 and/or 34, which results in the transfer of energy from sources 23 and/or 34, which in turn transfers heat to the outer surface of housing 2 and surfaces of strip 18 which melts the surface of strip 18 and housing 2 surface to create a permanent weld after re-solidification.

In some embodiments, strip 18 may have teeth at the top and a flat welding surface 36 on the bottom configured to tightly bind to the outer surface of housing 2. In some embodiments, a flat welding surface 36 may be of the same material as strip 18 or may be of another material that is more suitable to welding.

Figure 17:
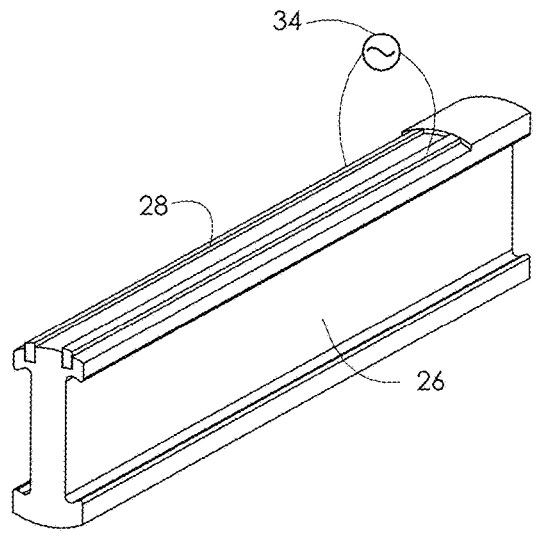
FIG. 17 is a perspective view of an exemplary internal support member of FIG. 12.
Figure 18:
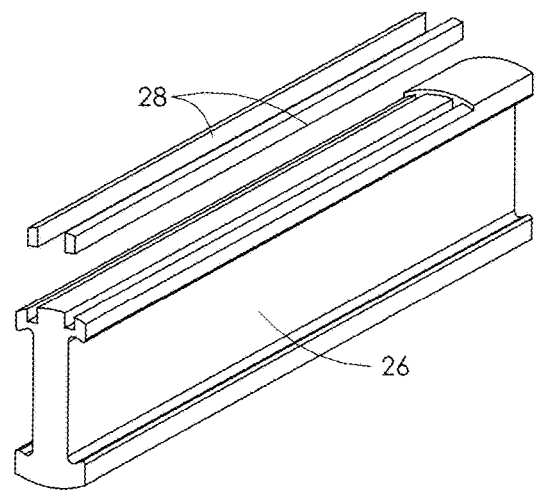
FIG. 18 is an exploded perspective view of an exemplary internal support member of FIG. 12.

FIGS. 17 and 18 show additional views (assembled and exploded) of internal support members, which include tube support 26 configured to keep housing 2 in the un-collapsed state. As shown internal support members may include grooves for housing two heating elements 28. Heating element 28 may be configured to exude heat when electrical power is provided to them.

Figure 19:
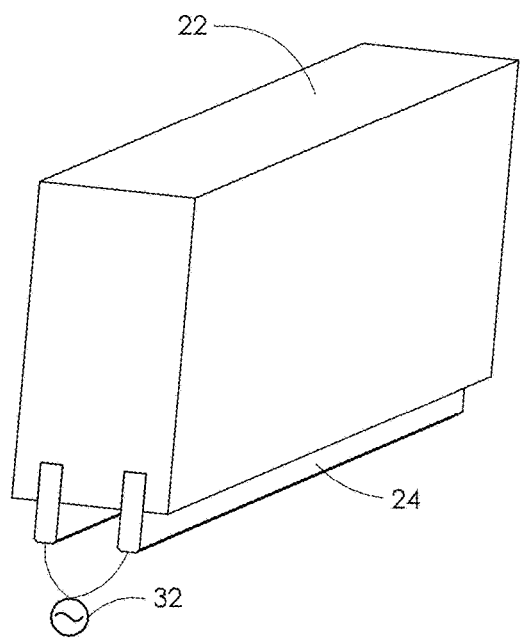
FIG. 19 is a perspective view of an exemplary outer support member of FIG. 12.
Figure 20:
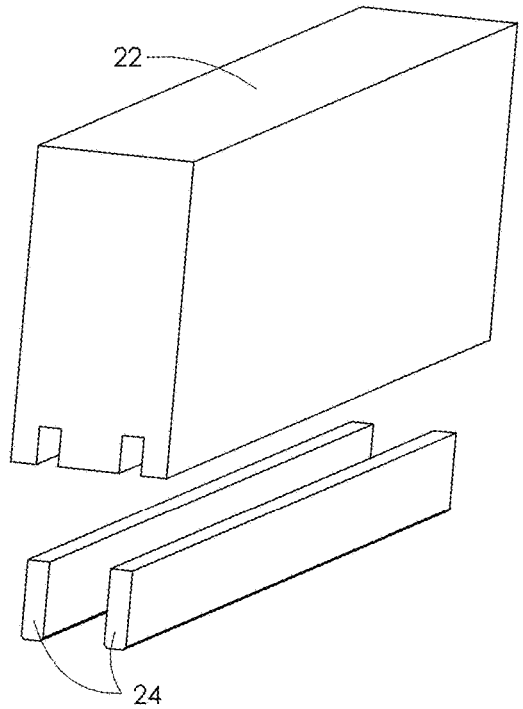
FIG. 20 is an exploded perspective view of an exemplary outer support member of FIG. 12.

FIGS. 19 and 20 show additional views (assembled and exploded) of an outer support member, which includes a compression member 22, which includes grooves for housing two heating elements 24. Heating elements 24 may be configured to exude heat when electrical power is provided to them. Together, the internal support member and the outer support member may crimp housing 2 and strip 18 while heat is provided by one of or both heating elements 24 and 28 to weld housing 2 and strip 18.

3. High-Frequency Sealing

FIGS. 21-33 depict methods and system (e.g., system 40) for connecting strip 38 to housing 2 using high-frequency electric power to create a permanent weld between an outer surface of strip 38 and housing 2. In some embodiments, strip 38 becomes permanently attached to the housing 2 surface by operation of a welding element contained in the outer support member which includes compression member 42 and inductor 44 connected to compression member 42 and powered by electrical energy source 46. In some embodiments, inductor 44 (e.g., when powered by electric power source 46) may partially melt the outer surface of housing 2 and the lower surface of strip 38 (e.g., by providing power to the conductive layer of housing 2 and/or conductive layer of strip 38), resulting in a permanent weld after re-solidification. In some embodiments, internal support member 48 (e.g., an anvil) may additionally or alternatively include inductor 52 that may be powered by electrical source 56 and is configured to partially melt the outer surface of housing 2 and the lower surface of strip 18 (e.g., by providing power to the conductive layer of housing 2 and/or conductive layer of strip 38), resulting in a permanent weld after re-solidification.

Figure 21:
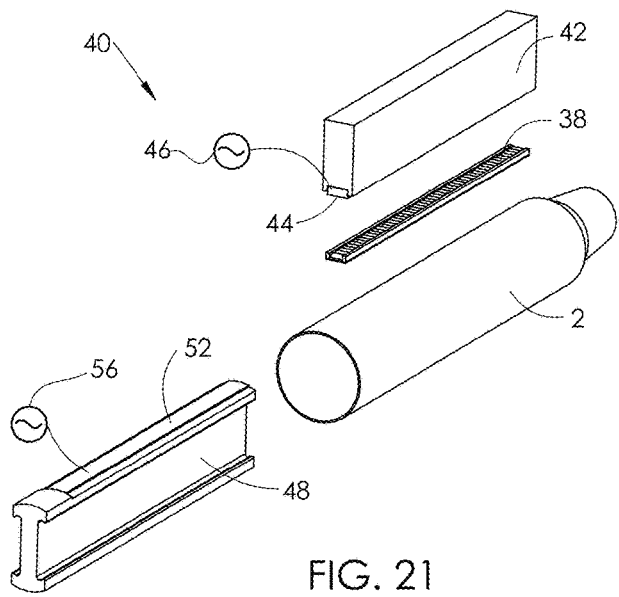
FIG. 21 is an exploded perspective view of a housing, strip, internal support member, and outer support member, according to some embodiments of the present disclosure.
Figure 22:
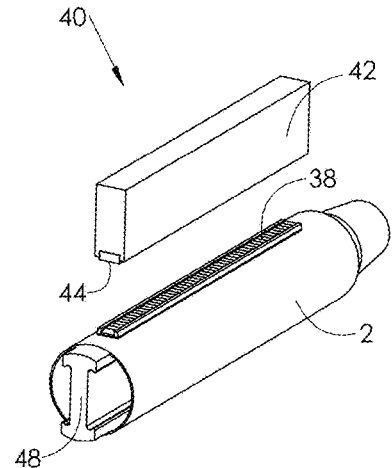
FIG. 22 is a perspective view of a housing, strip, internal support member, and outer support member, according to some embodiments of the present disclosure where the internal support member is inserted into the housing.
Figure 29:
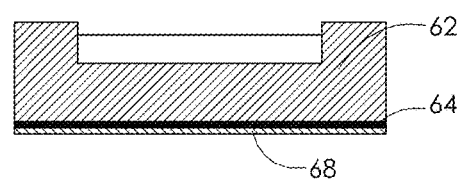
FIG. 29 is a sectional front view of FIG. 26.
Figure 30:
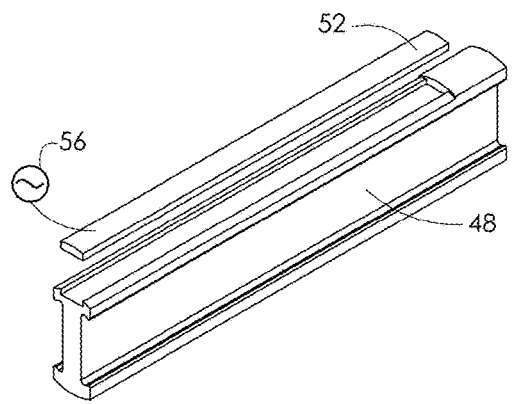
FIG. 30 is an exploded perspective view of an exemplary internal support member of FIG. 23.

FIG. 21 shows an exploded view of system 40 for high frequency sealing welding including an outer support member (which may include compression member 42), and internal support member 48 that is configured to permanently weld strip 38 (e.g., teethed strip) to housing 2. In some embodiments, strip 38 may include several layers as shown in FIG. 29, which depicts a cross-section of strip 38. In particular, strip 38 may include an aluminum layer 64 (or another conductive layer) surrounded by other material layers 68 and 62 (e.g., plastic or laminate). Housing 2 may additionally or alternatively include an aluminum layer (or another conductive layer) that is surrounded by other non-conductive materials (e.g., plastic or laminate).

In some embodiments, the outer support member includes a welding element which includes inductor 44 connected to electrical energy source 46. Energy source 46 may be a transducer or any other wired or wireless source or conduit of electrical energy. In some embodiments, electrical energy may be provided to energy source 46 by at least one wire or circuitry connected to a power grid, a battery, a generator, or any other electrical power source.

In some embodiments, internal support member 48 includes a welding element which includes inductor 52 connected to electrical energy source 56. Energy source 56 may be a transducer or any other wired or wireless source or conduit of electrical energy. In some embodiments, electrical energy may be provided to energy source 56 by at least one wire or circuitry connected to a power grid, a battery, a generator, or any other electrical power source.

Figure 23:
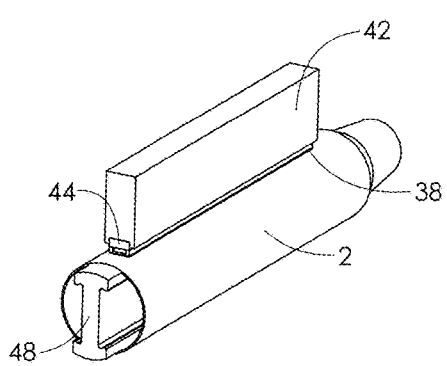
FIG. 23 is a perspective view of a housing, strip, internal support member, and outer support member in which the internal support member and the outer support member position the strip along the outer surface of the housing according to some embodiments of the present disclosure.
Figure 24:
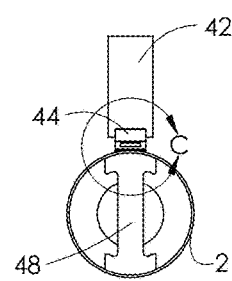
FIG. 24 is a front view of FIG. 23.
Figure 25:
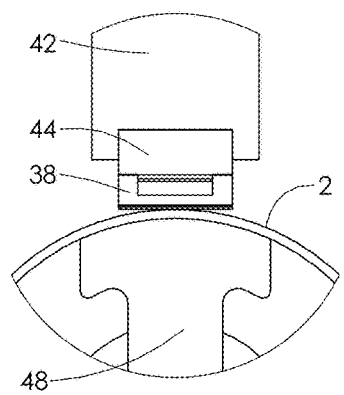
FIG. 25 is an enlarged portion of the front view of FIG. 24.

FIGS. 23-25 show perspective, front, and enlarged views of system 40 (e.g., in the process of welding strip 38 to housing 2). FIG. 25 shows an enlarged view of area C in FIG. 24. As shown, internal support member 48 may be shaped like an elongated anvil, with an outer surface matching the shape of housing 2 in its un-collapsed form. In some embodiments, other elongated shapes of internal support member 48 may be used, to prevent housing 2 from collapsing during welding operations.

In some embodiments, internal support member 48 may be inserted into housing 2. Then strip 38 may be oriented to housing 2, as showing FIGS. 23-25, by compression member 42. In particular, the internal support member 48 and compression member 42 may apply pressure to the strip 18 to hold it in place alongside housing 2 during activation of power sources 46 and/or 56, which results in the transfer of energy from sources 46 and/or 56 to inductors 44 and/or 52, which in turn transfer high-frequency alternating current to a conductive layer inside strip 38 and/or a conductive layer inside a wall of housing 2, which melts the surface of strip 38 and/or surface of housing 2 to create a permanent weld after re-solidification. Once the temperature reaches the melting point (e.g., 170 degrees Celsius), pressure may be applied to strip 38 and housing 2 (e.g., manually or using any suitable mechanical or pneumatic device) to complete the sealing process.

Figure 26:
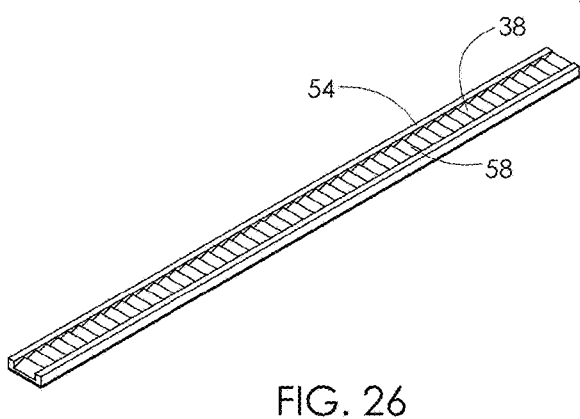
FIG. 26 is a perspective view of the strip, according to some embodiments of the present disclosure.
Figure 27:
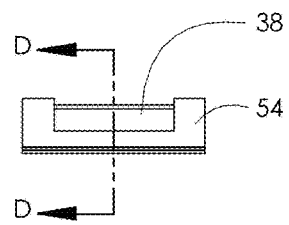
FIG. 27 is a front view of FIG. 26.
Figure 28:
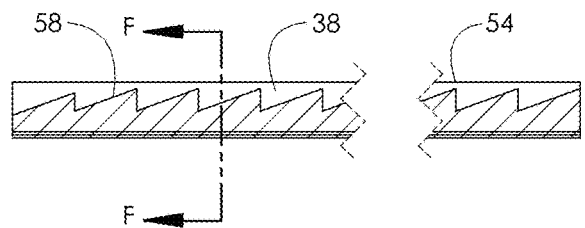
FIG. 28 is a sectional side view of FIG. 26.

In some embodiments, as shown in FIG. 26, strip 38 may have teethed portion 58 at the top and a flat compression surfaces 54 at the top (surrounding teethed portion 58) to enable tight compression by compression member 42. FIG. 27 shows the front view of strip 38 showing u-shaped compression portion 54. FIG. 28 shows sectional view D from FIG. 27 to illustrate teethed portion 58 in between compression portion 54. FIG. 29 shows sectional view F taken from FIG. 28. As shown, strip 38 includes portions 68 and 62, made from non-conductive material (e.g., non-metal, plastic, or laminate material), and portion 64, made from aluminum (or another conductive or metal material). During welding, high-frequency alternating current may be provided to portion 64, resulting in an increase in temperature to portion 64, subsequent increase in temperature to portions 64 and 68, resulting in full or partial melting of portion 68. In some embodiments, portion 68 re-solidifies and permanently binds to the outer surface of housing 2.

Figure 31:
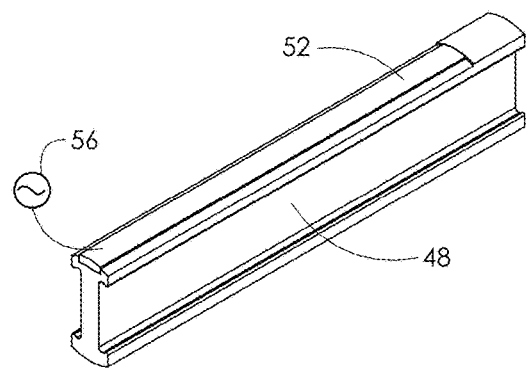
FIG. 31 is a perspective view of an exemplary internal support member of FIG. 23.

FIGS. 31 and 31 show additional views (assembled and exploded) of an internal support member which includes tube support 48 configured to keep housing 2 in the un-collapsed state. As shown, internal support member 48 may include a groove for housing inductor 52. Inductor 52 may be configured to transfer high-frequency alternating current to foil layer 64 when powered by power source 56. Inductor 52 may also be configured to transfer high-frequency alternating current to a foil layer of housing 2 (e.g., to partially melt the outer surface of housing 2 during welding).

Figure 32:
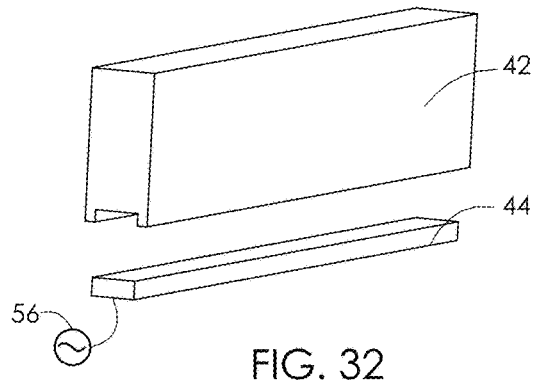
FIG. 32 is a perspective view of an exemplary outer support member of FIG. 23.
Figure 33:
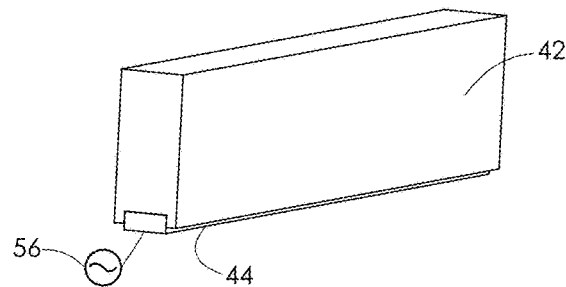
FIG. 33 is an exploded perspective view of an exemplary outer support member of FIG. 23.

FIGS. 32 and 33 show additional views (assembled and exploded) of an outer support member, which includes a compression member 42 which includes a groove for housing inductor 44. Inductor 44 may be configured to transfer high-frequency alternating current to foil layer 64 when powered by power source 56. Inductor 44 may also be configured to transfer high-frequency alternating current to a foil layer of housing 2 (e.g., to partially melt the outer surface of housing 2 during welding).

4. Hot Air Sealing

FIGS. 34-61A depict methods and systems (e.g., system 50) for connecting strip 88 to housing 2 using high-temperature air (or another gas) to create a permanent weld between an outer surface of strip 88 and housing 2. In some embodiments, strip 88 becomes permanently attached to the housing 2 surface by operation of the welding element contained in the outer support member, which includes a heating chamber 60. Heating chamber 60 may include heating chamber cover 76, hot air inlet 82, negative pressure inlet 78, and upper plate directors 74' and 74. In some embodiments, hot air (or another hot gas) circulating through chamber 60 may partially melt the outer surface of housing 2 and the lower surface of strip 88 (e.g., by providing heat to housing 2 and/or strip 88), resulting in a permanent weld after re-solidification.

Figure 34:
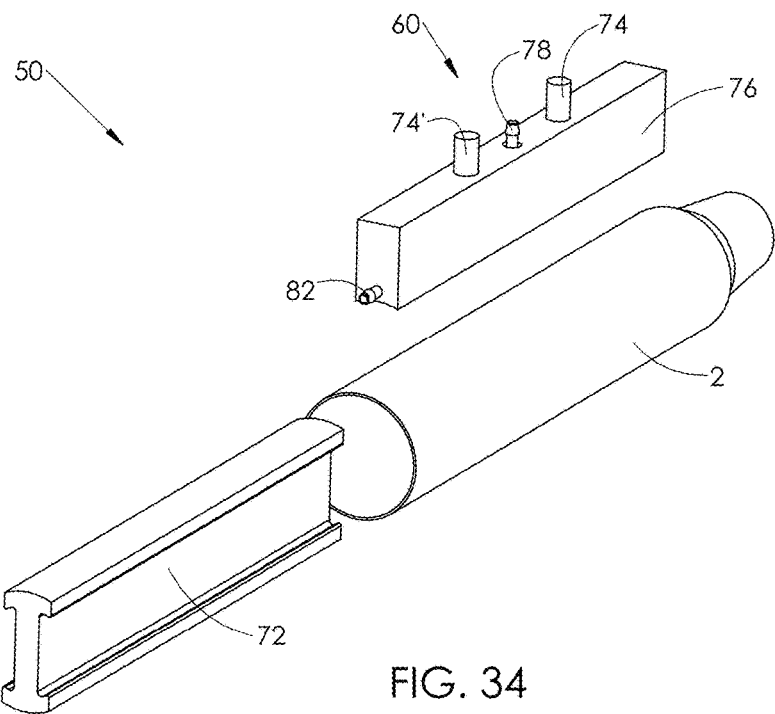
FIG. 34 is an exploded perspective view of a housing, strip, internal support member, and outer support member, according to some embodiments of the present disclosure.
Figure 35:
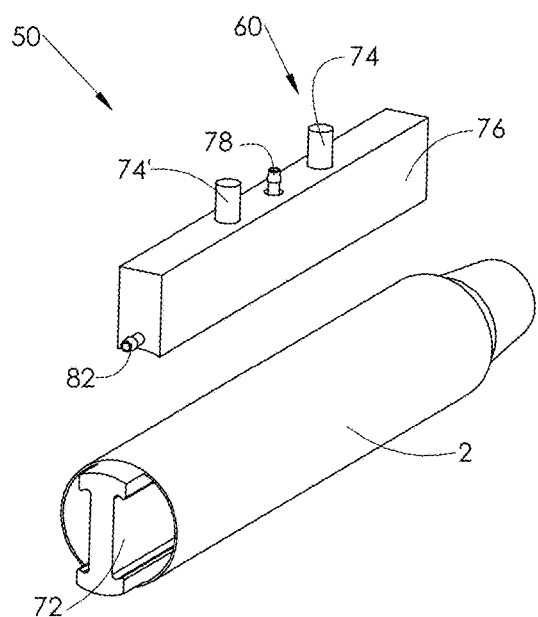
FIG. 35 is a perspective view of a housing, strip, internal support member, and outer support member, according to some embodiments of the present disclosure, where the internal support member is inserted into the housing.
Figure 36:
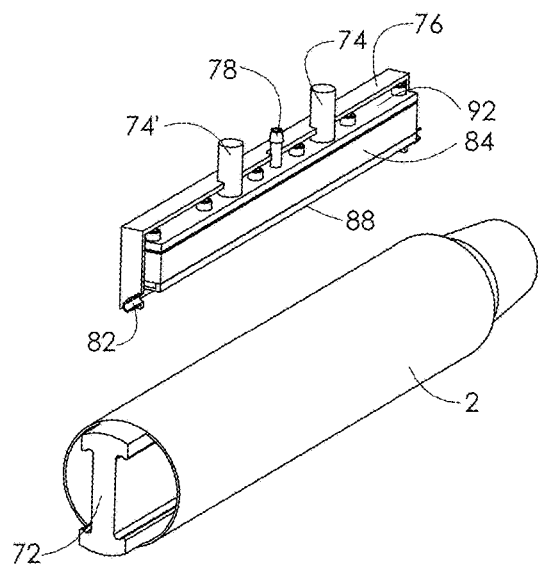
FIG. 36 is a perspective view of a housing, strip, internal support member, and exploded outer support member, according to some embodiments of the present disclosure, where the internal support member is inserted into the housing.

FIGS. 34-36 show various exploded and cutaway perspective views of system 50 (e.g., in the process of welding strip 88 to housing 2). As shown, internal support member 72 may be shaped like an elongated anvil, with an outer surface matching the shape of housing 2 in its un-collapsed form. In some embodiments, other elongated shapes of internal support member 72 may be used, to prevent housing 2 from collapsing during welding operations.

In some embodiments, internal support member 72 may be inserted into housing 2. Then strip 88 may be oriented to housing 2, as showing in FIG. 36, by heating chamber 60. In particular, the internal support member 72 and heating chamber 60 may apply pressure to the strip 88 and use negative pressure to hold strip 88 in place slightly away from housing 2 while hot air (or another gas) flows through the heating chamber, which melts the surface of strip 88 and/or surface of housing 2. After the melting, negative pressure may be removed to bring strip 88 in contact with housing 2 to create a permanent weld after re-solidification.

FIG. 36 shows exploded perspective views of system 50 with a cutaway of the heating chamber 60. As shown, heating chamber 60 may include heating chamber cover 76, the hot air inlet 82, negative pressure inlet 78, and upper plate directors 74' and 74. Upper plate directors 74' and 74 may be connected to compression member 84, which in turn is configured to apply pressure to strip 88 after activation of the welding element of system 50 to weld strip 88 to housing 2.

FIG. 37 shows the front view of the heating chamber 60 (e.g., when teethed strip 88 is located inside the chamber of the heating chamber 60). FIG. 38 shows sectional cutaway view G of the heating chamber 60 from FIG. 37. As shown, the heating chamber 60 may include compression member 84 that positions strip 88. The heating chamber 60 may also include upper plate directors 74 and 74' attached to compression member 84 and configured to selectively position compression member 84 relative to the upper plate 92 of the heating chamber cover 76. The heating chamber 60 may also include rubber gasket 94 under upper plate 92 configured to provide an airtight seal. The heating chamber 60 may also include hot air inlet 82 and hot air outlet 98. In some embodiments, during welding, hot air (or another heated gas) may be forced into hot air inlet 82 (e.g., using any suitable device from providing hot air such as boiler or compressor). For example, an air pipe may be connected from a hot air source to hot air inlet 82. In some embodiments, during welding, hot air (or another heated gas) may exit chamber 60 from hot air outlet 98, for example, due to hot air being forced into hot air inlet 82. In some embodiments, chamber 60 may also include negative pressure inlet 78. In some embodiments negative pressure inlet, 78 may be connected to any suitable system for creating negative pressure (e.g., a vacuum providing device or a pump) by a pipe or another suitable connector. In some embodiments, during welding, pressure inlet 78 may be used to selectively lower compression member 84 inside chamber 60 to make strip 88 contact the outer surface of housing 2 or not contact the outer surface of housing 2 (e.g., by selectively providing or releasing various amounts of negative pressure in negative pressure inlet 78).

FIGS. 39-41 show several enlarged views K, H, and J from FIG. 38. As shown, the heating chamber 60 may further include several screws 96 driven through apertures in the upper plate 92 and rubber gasket 94 and compression member 84 and positioned under heating chamber cover 76. While six screws are shown, any number of screws may be used.

Figure 44:
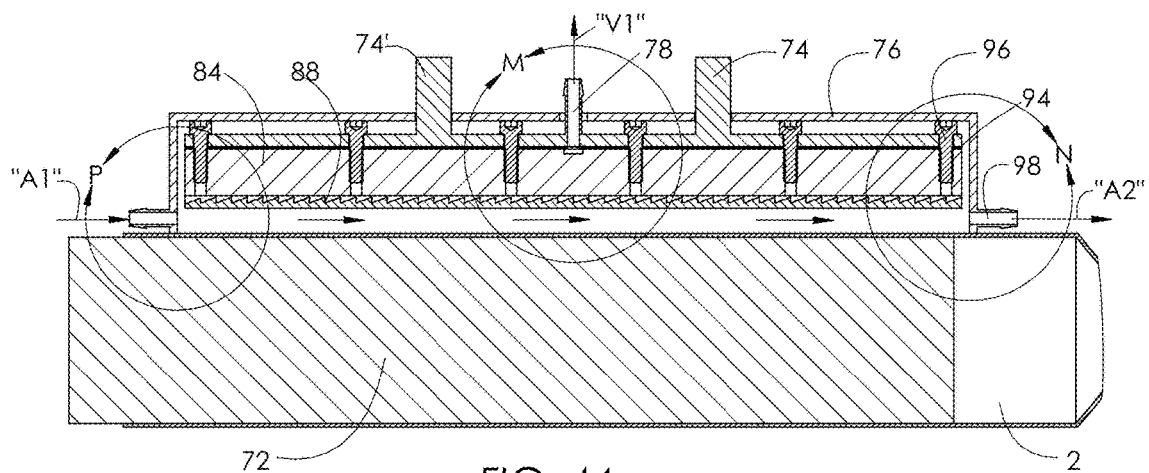
FIG. 44 is a side cutaway view of FIG. 42.
Figure 45:
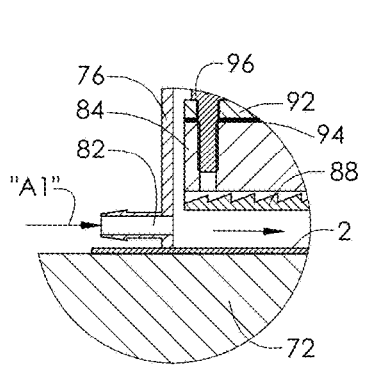
FIG. 45 is a partial enlarged view of FIG. 44.
Figure 46:
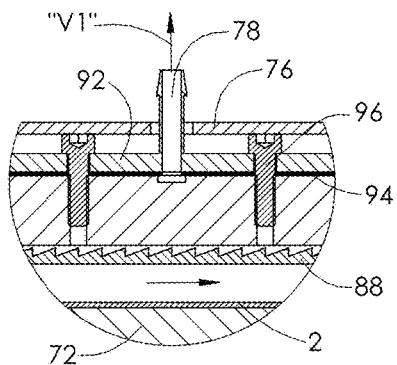
FIG. 46 is another partial enlarged view of FIG. 44.
Figure 47:
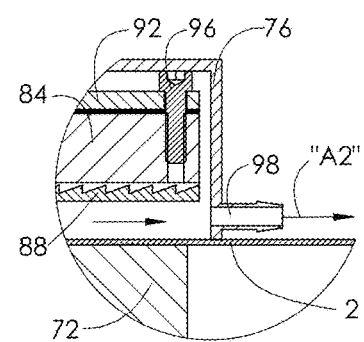
FIG. 47 is another partial enlarged view of FIG. 44.

FIGS. 42 and 43 show perspective and front views of system 50 before compression member 84 is lowered inside chamber 60 to make strip 88 contact the outer surface of housing 2. FIG. 44 shows a sectional side view L from FIG. 43 during the welding operation. In particular, airflow A1 may be provided into inlet 82 to exit chamber 60 from outlet 98 as flow A2. At the same time, low pressure (e.g., vacuum V1) may be provided via inlet 78 to keep compression member 84 and strip 88 away from the outer surface of housing 2 into which internal support member 72 is inserted. FIGS. 45-47 show enlarged views P, M, and N from FIG. 44. During the welding operation, airflow A1 to A2 may heat and partially melt the bottom surface of strip 88 and the upper outer surface of housing 2 in preparation for welding.

Figure 48:
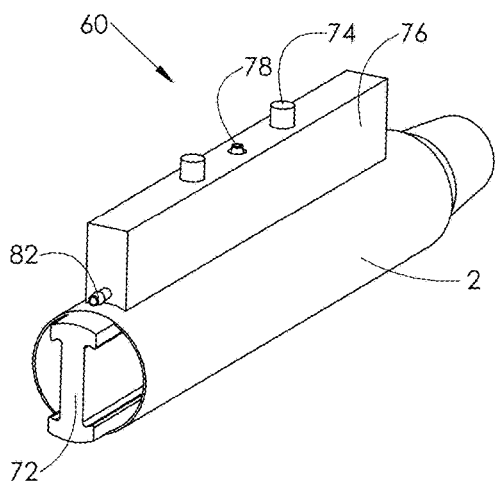
FIG. 48 is a perspective view of a housing, strip, internal support member, and outer support member, in which the internal support member and the outer support member position the strip next to the outer surface of the housing, according to some embodiments of the present disclosure.
Figure 49:
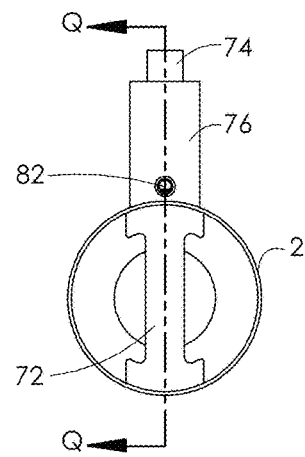
FIG. 49 is a front view of FIG. 48.
Figure 50:
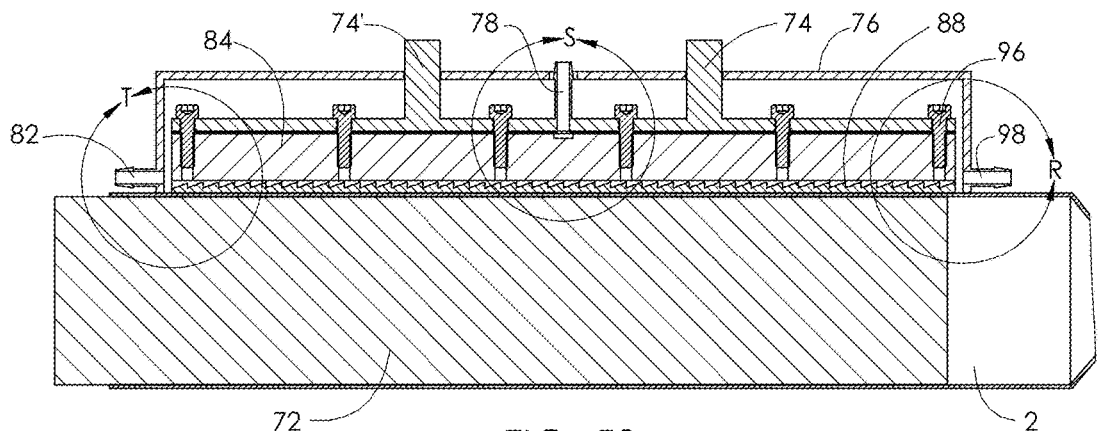
FIG. 50 is a side cutaway view of FIG. 48.
Figure 51:
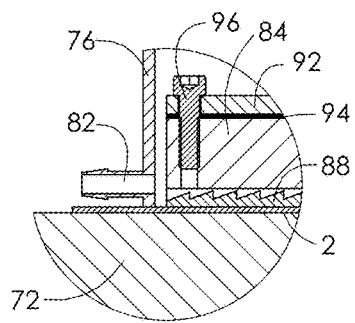
FIG. 51 is a partial enlarged view of FIG. 50.
Figure 52:
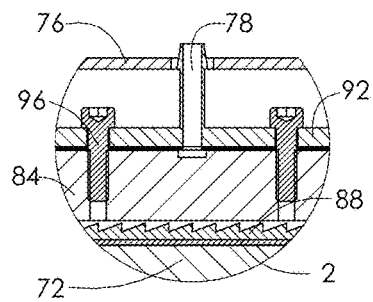
FIG. 52 is another partial enlarged view of FIG. 50.
Figure 53:
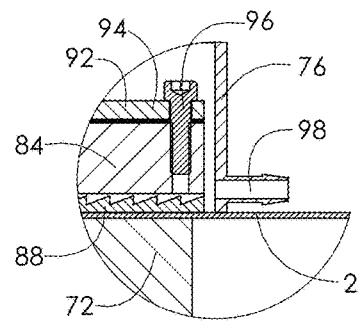
FIG. 53 is another partial enlarged view of FIG. 50

FIGS. 48 and 49 show perspective and front views of system 50 after compression member 84 is lowered inside chamber 60 to make strip 88 contact the outer surface of housing 2. FIG. 50 shows a sectional side view 2 from FIG. 49 during the welding operation. In particular, airflow A1 may be no longer provided. At the same time, low pressure (e.g., vacuum V1) may be no longer provided via inlet 78 to result in compression member 84 and strip 88 moving down to contact the outer surface of housing 2, into which internal support member 72 is inserted. FIGS. 51-53 show enlarged views T, S, and R from FIG. 50. During the welding operation, partially melted bottom surface of strip 88 and partially melted upper outer surface of housing 2 contact, which results in a permanent weld after re-solidification.

Figure 54:
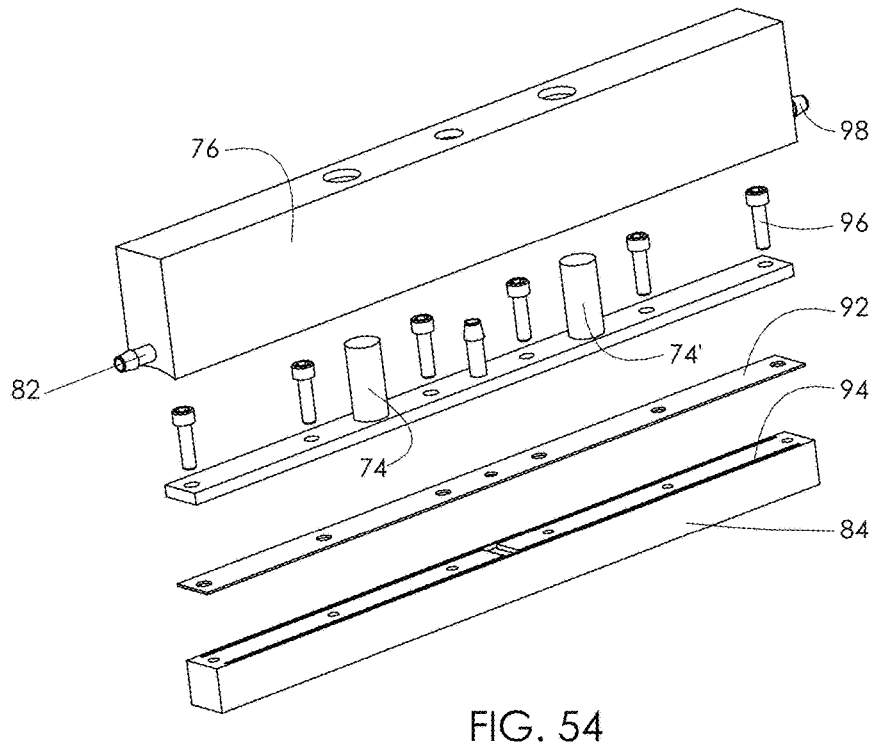
FIG. 54 is an exploded perspective view of an exemplary outer support member of FIG. 48.

FIG. 54 shows an exploded view of the heating chamber 60. As can be seen, screws 96 may be connected to the member with upper plate directors 74 and 74' to upper plate 92, to rubber gasket 94 to compression member 84. After the assembly with screws 96, assembled compression member 84 may move up or down with respect to heating chamber cover 76 due to upper plate directors 74 and 74' and negative pressure inlet 78 fitting through matching apertures in heating chamber cover 76. Heating chamber cover 76 may also include hot air inlet 82 and hot air outlet 98.

Figure 55:
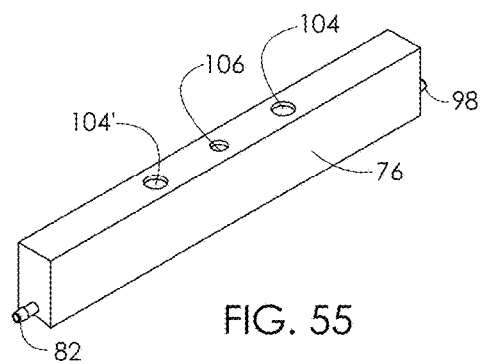
FIG. 55 is a perspective view of an exemplary outer support member of FIG. 48.
Figure 56:
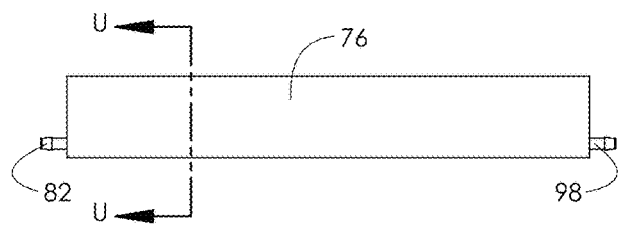
FIG. 56 is a side view of FIG. 55.
Figure 57:
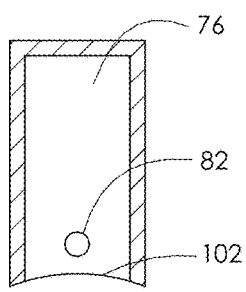
FIG. 57 is a front view of FIG. 55.

FIG. 55 shows a perspective view of the heating chamber cover 76. As shown, it may include aperture 104 for upper plate directors 74, aperture 104' for upper plate directors 74', and aperture 106 for negative pressure inlet 78. FIG. 56 shows a side view of the heating chamber cover 76. FIG. 57 shows a front view of heating chamber cover 76 illustrating a curved cover cutout for enabling chamber cover 76 to contact the curved outer surface of housing 2 with internal support member 72 inserted.

Figure 58:
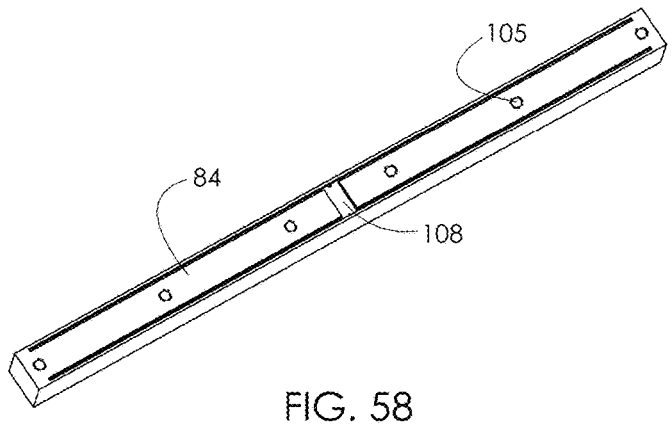
FIG. 58 is a perspective view of an exemplary outer support member of FIG. 54.
Figure 59:
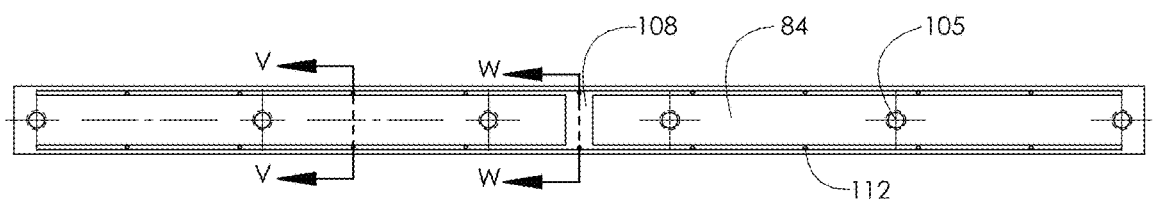
FIG. 59 is a top view of FIG. 58.
Figure 60:
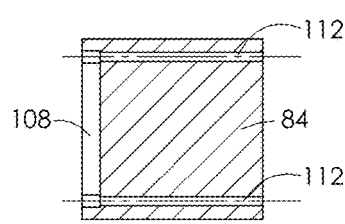
FIG. 60 is a front sectional view of FIG. 58.
Figure 61:
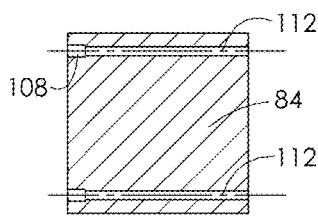
FIG. 61 is another front sectional view of FIG. 58.

FIG. 58 shows is a perspective view of heating chamber's 60 compression member 84. Chamber compression member 84 may include negative pressure cutouts 108. Chamber compression member 84 may also include threaded apertures 105 for screws 96. FIG. 59 shows the top view of heating chamber 60 compression member 84 illustrating negative pressure cutouts 108 and 112. FIGS. 60 and 61 show sectional views V and W of compression member 84 further illustrating negative pressure cutouts 108 and 112.

Figure 61A:
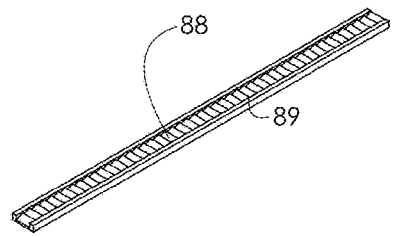
FIG. 61A is a perspective view of a strip, according to some embodiments of the present disclosure.

In some embodiments, as shown in FIG. 61A, strip 88 may have teethed portion 89 at the top and flat compression surfaces at the top (surrounding teethed portion 89) to enable tighter compression by compression member 84.

In some embodiments, strip 88 may be located inside heating chamber assembly 60. Strip 88 may be held in place by suction and negative pressure "V1" (e.g., as shown in FIG. 44) delivered through inlet 78. In some embodiments, internal support member 72 may be inserted into housing 2. Then, heating chamber assembly 50 may be positioned such that surface 102 contacts the outer surface of housing 2. Afterward, hot air "A1" (e.g., as shown in FIG. 44) may be supplied through inlet 82 (towards outlet 98) to heat housing 2 surface and surface of strip 88. Hot air may circulate through heating chamber assembly 60 from inlet 82 to outlet 98. When the temperature of the surfaces of strip 88 and housing 2 reaches a desirable point for welding (e.g., 170 degrees Celsius), the compression member 84 of heating chamber assembly 50 may compress strip 88 to the outer surface of housing 2 to complete the weld. The desirable point for temperature may be detected using a thermometer. Alternatively, a timing chart may be used to determine that the desirable point for temperature has been reached. Heating chamber assembly 60 may include inlet 78 for suction, inlet 82 and outlet 98 for circulation of hot air, and screws 95 for holding assembly and parts of the assembly shown in FIG. 54 in place. For example, heating chamber assembly 60 may include rubber gasket 95, and compression member 84 held together by screws 96.

5. Housing and Pusher

Figure 62:
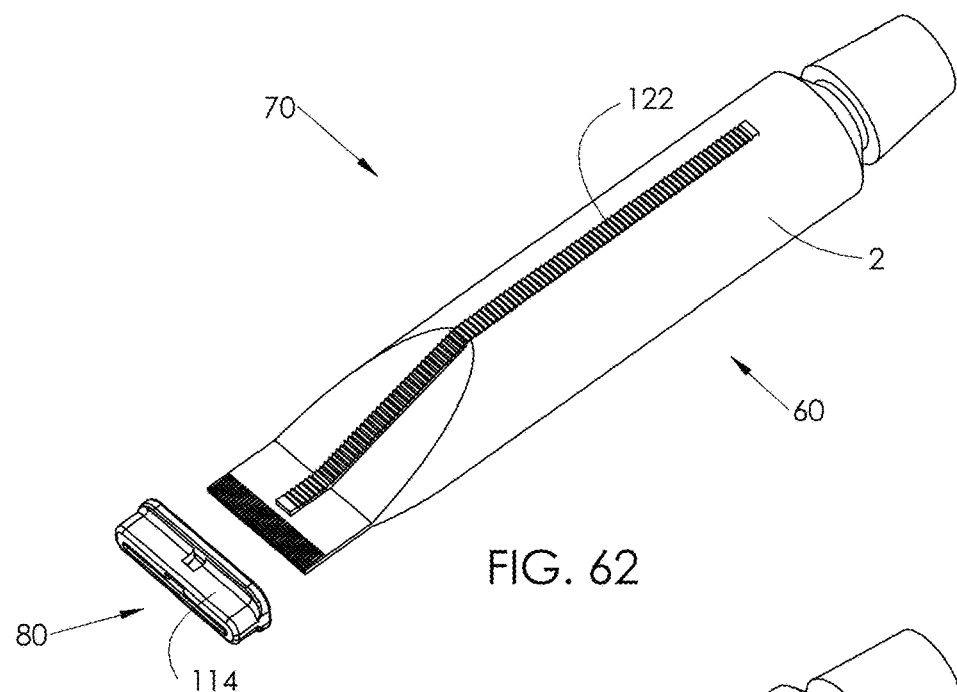
FIG. 62 is a perspective view of a housing, strip, and un-attached pusher, according to some embodiments of the present disclosure.
Figure 63:
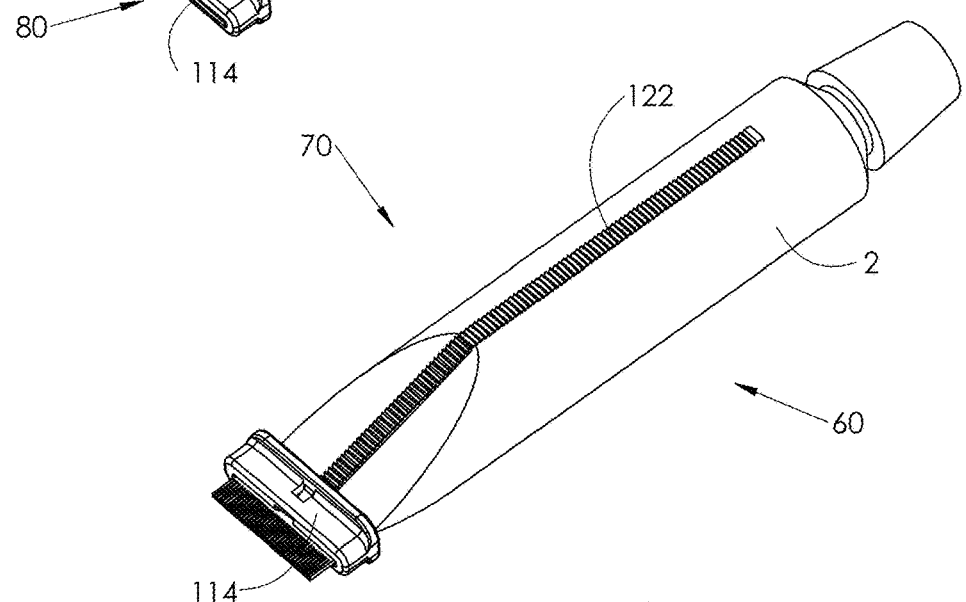
FIG. 63 is a perspective view of a housing, strip, and inserted pusher, according to some embodiments of the present disclosure.
Figure 64:
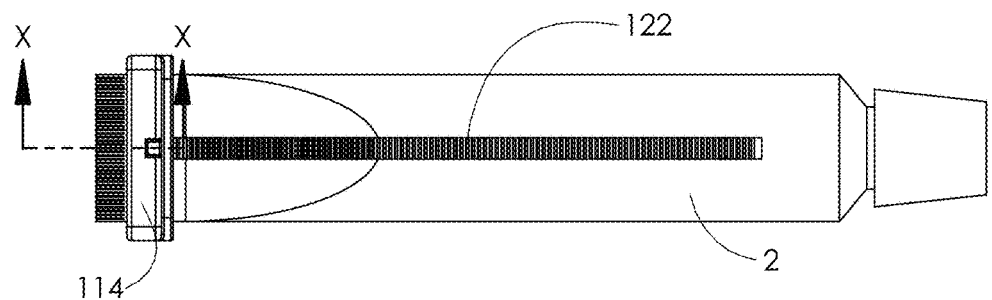
FIG. 64 is a top view of FIG. 63.
Figure 65:
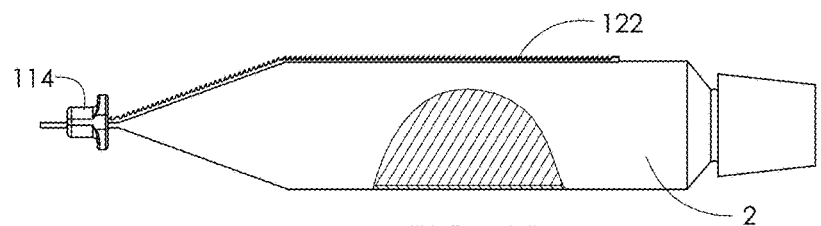
FIG. 65 is a side view of FIG. 63 with material inside of the housing.

FIGS. 62-69 depict the use of single body pusher 114. FIG. 62 shows sealed housing 2 with attached teethed strip 122. Strip 122 may be attached using any one of the embodiments described above. Also shown is pusher 114, in which pusher 114 may be configured to engage with the teeth of strip 122 to selectively compress and collapse housing 2 (e.g., to expel material contained by housing 2). In some embodiments, pusher 114 may be a single body pusher. As shown in FIG. 63, pusher 114 may include an aperture that can accept the sealed end of housing 2, which allows pusher 114 to move along the length of housing 2. FIG. 64. depicts a top view of housing 2 with attached strip 122 and inserted pusher 114. FIG. 65 is a side view of housing 2 with attached strip 122 and inserted pusher 114. As shown, housing 2 may include material inside, which is selectively expelled by the movement of pusher 114 when housing 2 selectively collapses.

Figure 66:
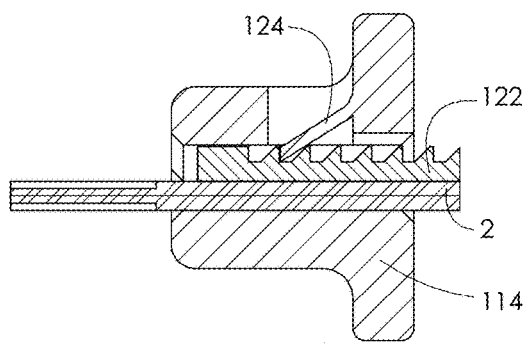
FIG. 66 is a cutaway side view of FIG. 63.

FIG. 66 is a sectional view X of housing/pusher assembly of FIG. 64. As shown, pusher 114 may include flexible lip 124 configured to engage with the teeth of strip 122. In particular, lip 124 may be angled against the length of housing 2, so as not to impede the movement of pusher 114 along the length of housing 2 in the forward direction, but to catch on teeth and impede the movement of pusher 114 along the length of housing 2 in the backwards direction.

Figure 67:
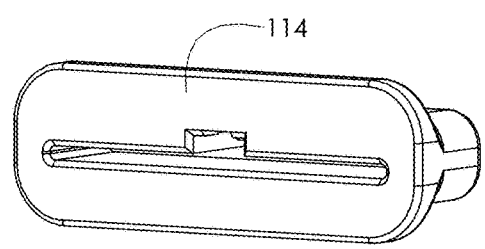
FIG. 67 is a perspective view of a pusher, according to some embodiments of the present disclosure.

FIG. 67 is a perspective view of pusher 114. As shown, pusher 114 may include an aperture configured to accept parts of housing 2 through the narrow part of the aperture and parts of housing 2 and strip 122 through the wide part of the aperture.

Figure 68:
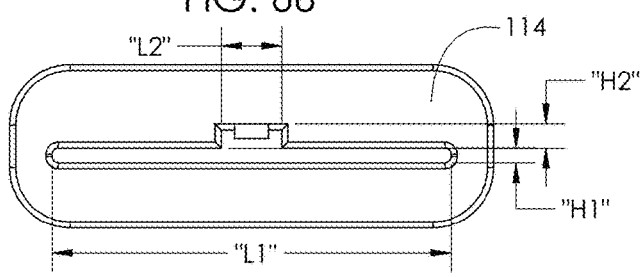
FIG. 68 is a front view FIG. 66.
Figure 69:
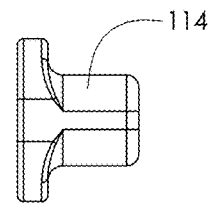
FIG. 69 is a side view of FIG. 66.

FIGS. 68 and 69 are front and side views of pusher 114. In some embodiments, the aperture may have height H1 in narrow portions, where H1 matches the height of housing 2 in a collapsed state. In some embodiments, the aperture may have height H2 in wide portions, where H2 matches the height of housing 2 in the collapsed state added with the height of strip 122. The aperture may have total length L1, which matches the width of housing 2. The wide part of the aperture may have length L2, which matches the width of strip 122.

6. Housing and Assembly Pusher

Figure 70:
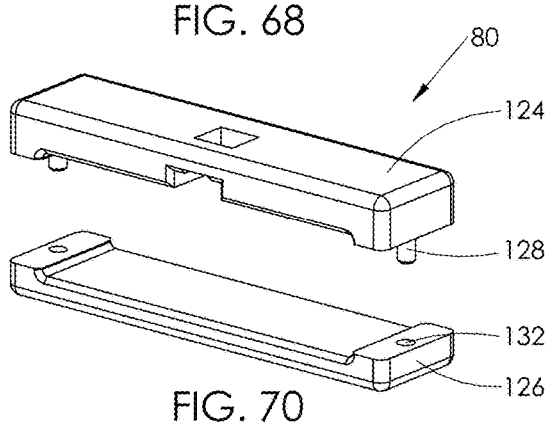
FIG. 70 is an exploded perspective view of a pusher, according to some embodiments of the present disclosure.
Figure 71:
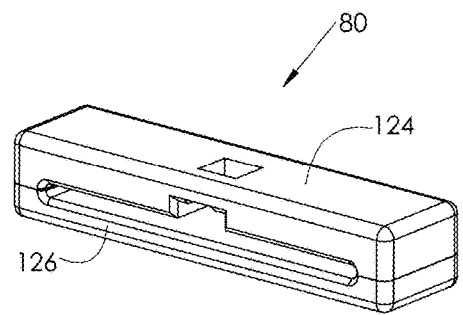
FIG. 71 is a perspective view of a pusher, according to some embodiments of the present disclosure.
Figure 72:
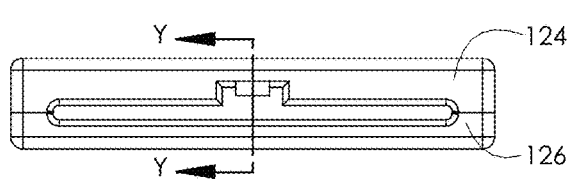
FIG. 72 is a front view of FIG. 71.
Figure 73:
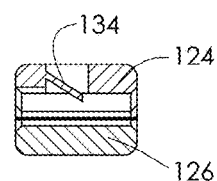
FIG. 73 is a cutaway side view of FIG. 71.

FIGS. 70-73 depict assembly pusher 80. FIG. 70 is an exploded view of assembly pusher 80, comprising pusher upper body 124 and pusher lower body 126. In some embodiments, pusher upper body 124 may have engagement pins 128 and pusher lower body 126 may have engagement apertures 126. Engagement pins 128 may be press-fitted (e.g., by manufacturer or by an end-user) to snap pusher upper body 124 and pusher lower body 126 together, as shown in FIG. 71. In some embodiments, pusher upper body 124 and pusher lower body 126 may also be welded after the snap in place. Pusher 80 may be inserted over housing 2 and strip 122 assembly from the rear portion of housing 2. In some embodiments, pusher upper body 124 and pusher lower body 126 of pusher 80 may be connected by side insertion. FIG. 72 shows the front view of pusher 80. FIG. 73 shows cross-section view Y of pusher 80 from FIG. 72. As shown, pusher upper body 124 may include a flexible lip 134. In particular, lip 134 may be angled against the length of housing 2, so as not to impede the movement of pusher 80 along the length of housing 2 in the forward direction, but to catch on teeth and impeded the movement of pusher 80 along the length of housing 2 in the backwards direction.

7. Multi-Strip Container

FIGS. 74-78 depict a multi-strip container. Each of strips 134 may be welded to housing 2 using any technique described above or by use of temporary or permanent adhesive. While two strips are shown, any number of strips may be attached to housing 2.

Figure 74:
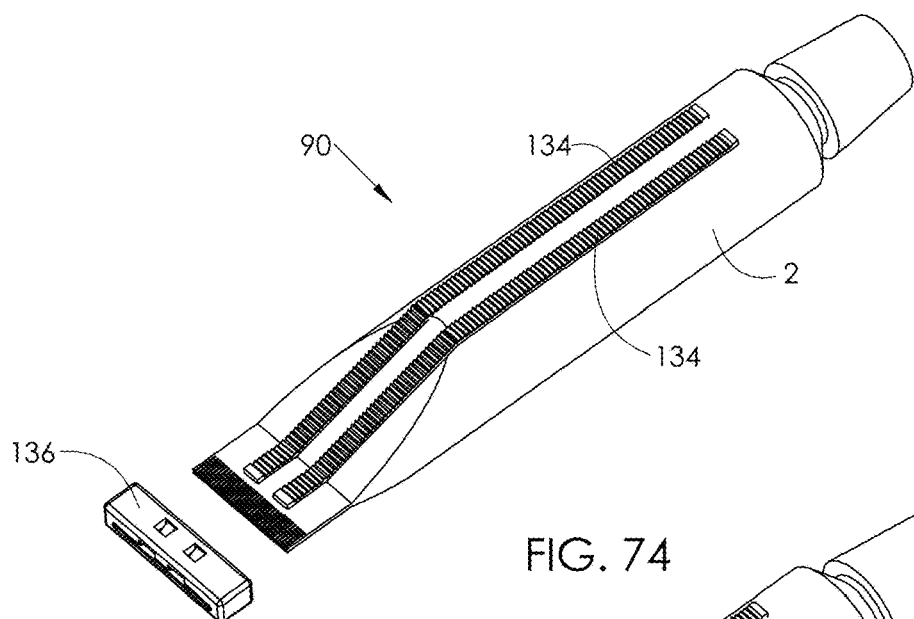
FIG. 74 is a perspective view of a housing, strips, and an un-attached pusher, according to some embodiments of the present disclosure.
Figure 75:
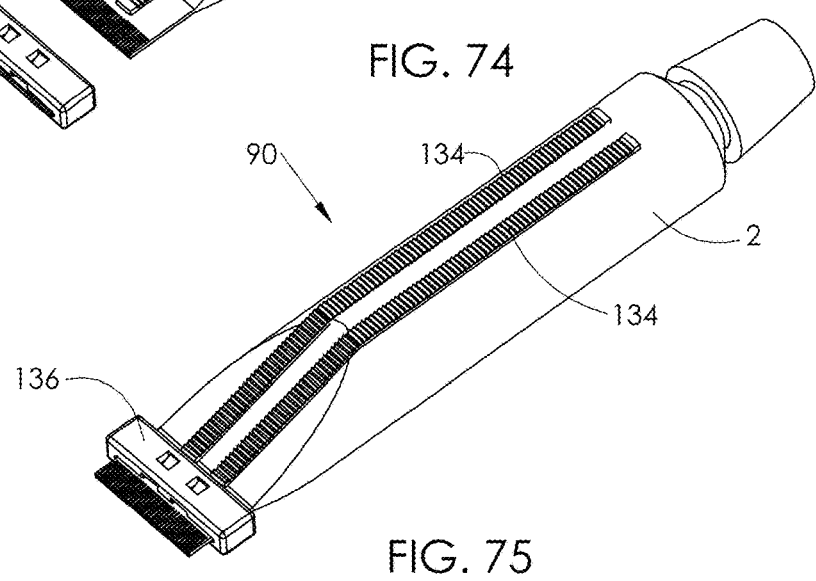
FIG. 75 is a perspective view of a housing, strips, and an inserted pusher, according to some embodiments of the present disclosure.
Figure 76:
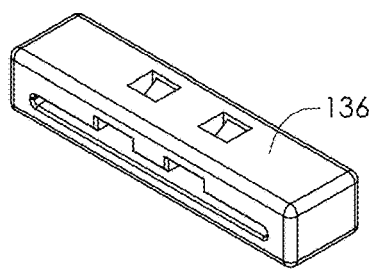
FIG. 76 is a perspective view of a pusher, according to some embodiments of the present disclosure.

FIG. 74 shows sealed housing 2 with attached teethed strips 134. Strips 134 may be attached using any one of the embodiments described above. Also shown is pusher 136, in which pusher 136 may be configured to engage with teeth of both strips 134 to selectively compress and collapse housing 2 (e.g., to expel material contained by housing 2). In some embodiments, pusher 136 may be a single body pusher or assembly pusher. As shown in FIG. 76, pusher 136 may include an aperture that can accept the sealed end of housing 2, which enables pusher 114 to move along the length of housing 2, resulting in selective collapsing of housing 2.

Figure 77:
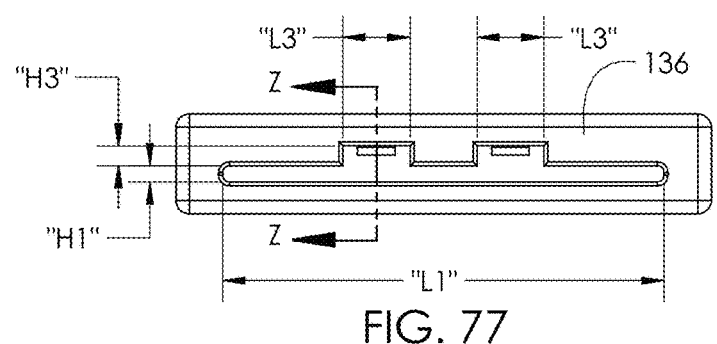
FIG. 77 is a front view of FIG. 77.

FIG. 77 is a front view of pusher 136 with an aperture that includes a narrow portion and two wide portions. In some embodiments, the aperture may have height H1 in narrow portions, where H1 matches the height of housing 2 in its collapsed state. In some embodiments, the aperture may have height H3 in wide portions, where H3 matches the height of housing 2 in its collapsed state added with the height of one of strips 134. The aperture may have total length L1, which matches the width of housing 2. Each wide part of the aperture may have length L3, which matches the width of each strip 134.

Figure 78:
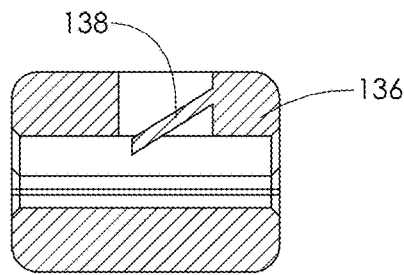
FIG. 78 is a cutaway side view of FIG. 77.

FIG. 78 shows cross-section view Z of pusher 136 from FIG. 77. As shown, pusher upper body 124 may include flexible lip 138. In particular, lip 138 may be angled against the length of housing 2, so as not to impede the movement of pusher 138 along the length of housing 2 in the forward direction, but to catch on the teeth of both strips 134 and impede the movement of pusher 80 along the length of housing 2 in the backwards direction.

8. Nested Housings

FIGS. 79-85 depict an assembly of a container that includes an outer housing 144 (e.g., a tube) with a larger diameter and inner housing 146 (e.g., a tube) with a smaller diameter, where housing 146 is located inside housing 144. Housings 146 and 144 may be held together at the front in a way that allows the material to be expelled out of both housings at the same time (e.g., by reducing the volume of housing 144 and housing 146 simultaneously by concurrent collapsing of both housings 144 and 146).

Figure 79:
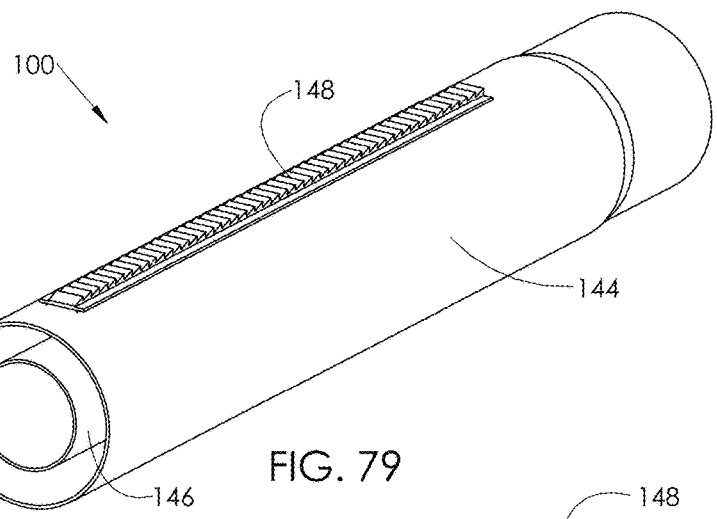
FIG. 79 is a perspective view of a nested housing with attached strip, according to some embodiments of the present disclosure.

FIG. 79 shows a perspective view of nested tube assembly 100 comprising outer housing 144, and an inner housing 146. In some embodiments, strip 148 may be permanently or detachably attached to the surface of housings 144 (e.g., using any welding methods described above or by permanent or detachable glue). In some embodiments, the strip may be attached to outer housing 144 before or after outer housing 144 is attached to inner housing 146.

Figure 80:
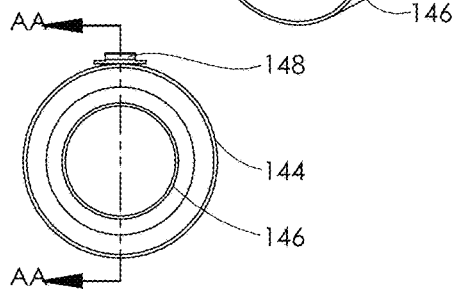
FIG. 80 is a front view of FIG. 79.
Figure 81:
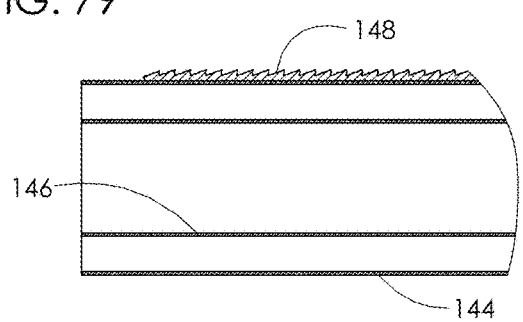
FIG. 81 is a cutaway side view of FIG. 79.

FIG. 80 shows the front view of nested tube assembly 100. FIG. 81—is a cross-section view AA of nested tube assembly 100 from FIG. 80. As can be seen, two distinct cavities for materials are created, one inside inner housing 146, and one outside housing 146 but inside housing 144.

Figure 82:
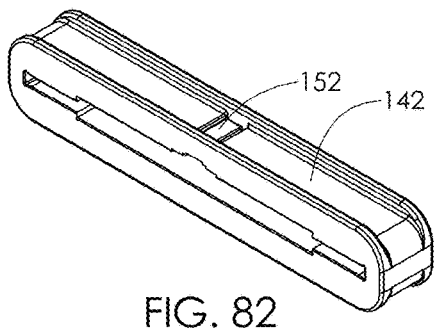
FIG. 82 is a perspective view of a pusher for a nested container according to some embodiments of the present disclosure.

FIG. 82 shows a perspective view of pusher 142 suitable for nested tube assembly 100. Pusher 142 may include a flexible lip 152. In particular, lip 152 may be angled against the length of housing 144, so as not to impede the movement of pusher 142 along the length of housing 144 in the forward direction, but to catch on the teeth of strip 148 and impede the movement of pusher 142 along the length of housing 144 in the backwards direction.

In one approach, a user may manually collapse both housings 144 and 146 to expel the same or different materials housed in two cavities of nested tube assembly 100. However, such an approach is deficient because it is difficult for an end-user to evenly squeeze out material from both cavities. The use of pusher 142 along strip 148 solves this problem by collapsing an exact amount of both housings 144 and 146 with each move of the pusher from lip 152 engaging one tooth of strip 148 to lip 152 engaging the next tooth of strip 148. In this way, precise doses of both materials can be squeezed out, allowing for use in applications where the precise ratio of expelled materials is critical (e.g., when mixing epoxy and an epoxy activator).

Figure 83:
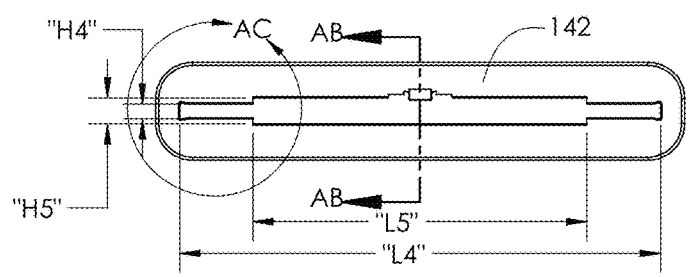
FIG. 83 is a front view of FIG. 82.

FIG. 83 shows a front view of pusher 142 showing an aperture with a narrow portion, a wider portion, and the widest portion in the middle. In some embodiments, the length of the narrow portion L4 may correspond to the width of outer housing 144 in a collapsed state. The length of a wider portion L5 may correspond to the width of inner housing 146 in a collapsed state. Moreover, the length of the widest portion of the aperture (in the middle) may correspond to the width of strip 148. The height of narrow portion H4 may correspond to the height of outer housing 144 in its collapsed state. The height of the wider portion H5 may correspond to the height of outer housing 144 in its collapsed state added with the height of inner housing 146 in its collapsed state. In this way, when guided by strip 148, pusher 142 may accommodate both outer housing 144 and inner housing 146 being pushed through the aperture to squeeze out material from both housings 144 and 146. Additionally, the widest portion of the aperture (in the middle) may correspond to the height of outer housing 144 in its collapsed state added with the height of inner housing 146 in its collapsed state added to the height of strip 148. In this way, lip 152 may engage with the teeth of strip 148 when pusher 142 is pushed along the length of both housings 144 and 146.

Figure 84:
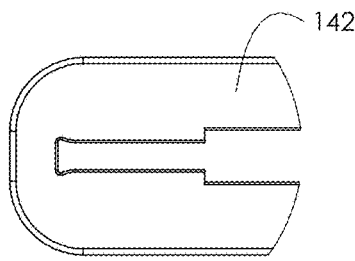
FIG. 84 is a partial enlarged view of FIG. 82.
Figure 85:
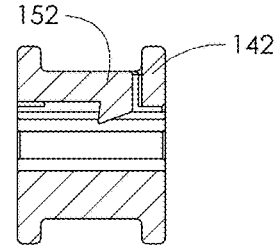
FIG. 85 is a cutaway side view of a FIG. 82.

FIG. 84 is a cross-sectional view AC of pusher 142 from FIG. 83. FIG. 85 is a cross-section view AB from FIG. 83. This view further illustrates the flexible lip 152.

9. Two Housing Assembly

FIGS. 86-89 depicts an assembly of a container that includes two housings 164 (e.g., tubes) permanently or detachably connected side by side (e.g., by a weld described above or using permanent or detachable glue, or by a pusher). One or both of housings 164 may further include attached strip 162. Strip 162 may be permanently or detachably attached to one of housings 164 by any of the welding techniques described above or by permanent or detachable glue. When a pusher is moved along housings 164 guided by strip 162, the material may be squeezed out from both housings 164 simultaneously.

Figure 86:
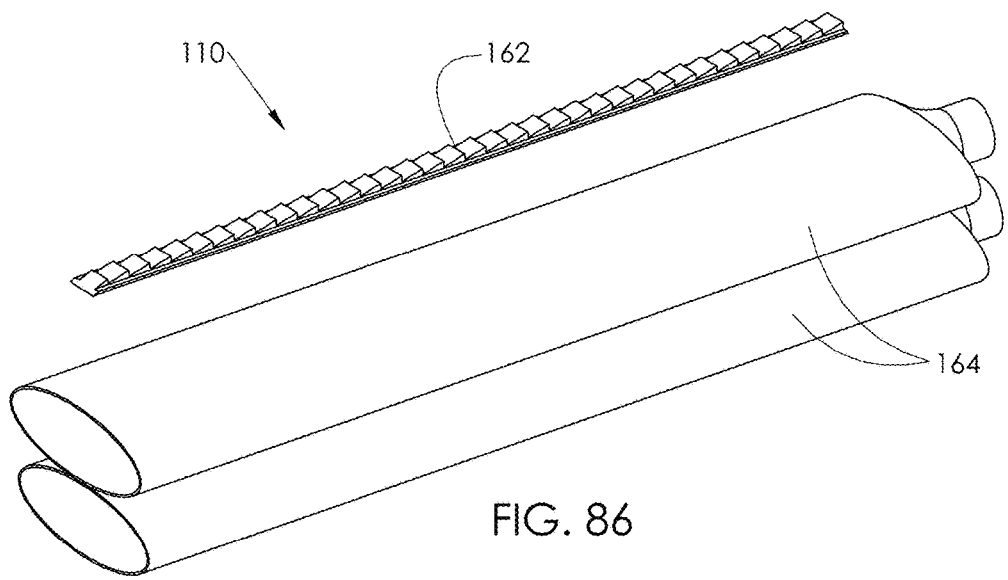
FIG. 86 is an exploded perspective view of two housings and a strip, according to some embodiments of the present disclosure.
Figure 87:
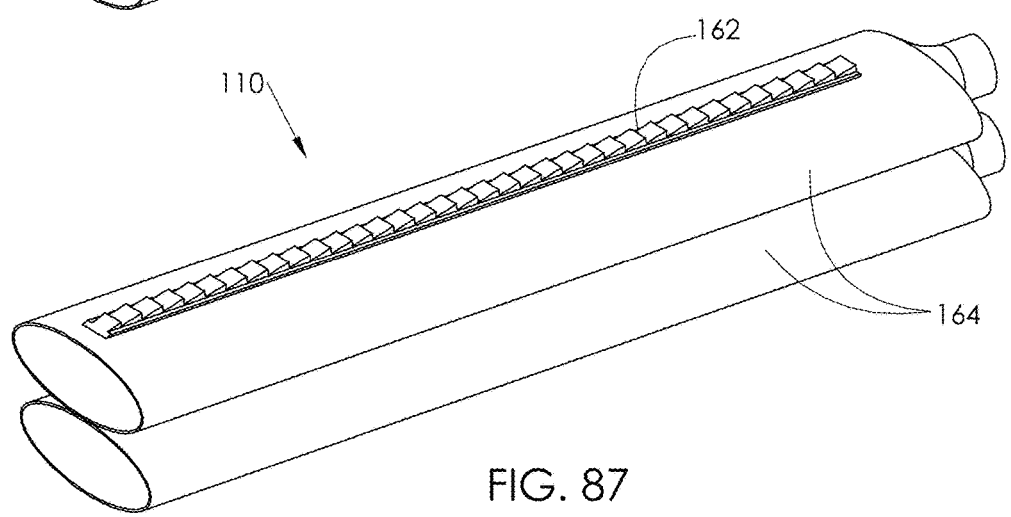
FIG. 87 is a perspective view of two housings, with an attached strip, according to some embodiments of the present disclosure.
Figure 88:
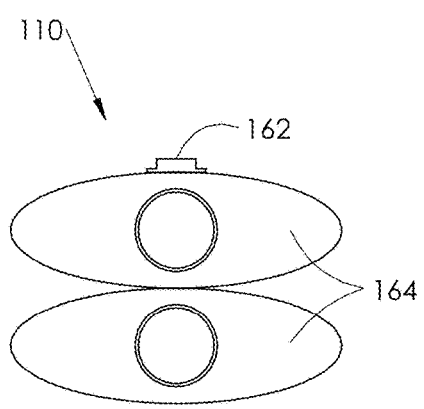
FIG. 88 is a front view of FIG. 87.
Figure 89:
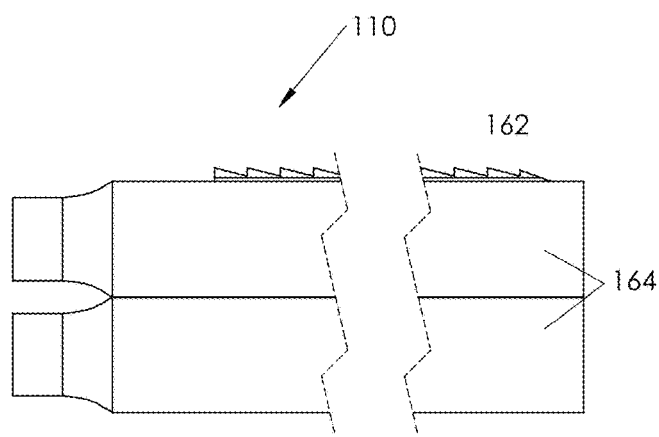
FIG. 89 is a side view of FIG. 87.

FIG. 86 is a perspective view of two-housing assembly 110 before strip 162 has been attached to one of housings 164. FIG. 86 is a perspective view of two-housing assembly 110 after strip 162 been attached to one of housings 164. In some embodiments, housings 164 may be connected (e.g., by weld or adhesive) before or after strip 162 is attached. In some embodiments, housings 164 may be disconnected but may become squeezed together when pushed through an aperture of a single pusher. A pusher for two-housing assembly 110 may be similar to the pusher of FIG. 67 or 71 but may include a wider aperture. For example, a narrower portion of the aperture may be equal to the height of both housings 164 in their collapsed states, while the wider portion of the aperture may be equal to the height of both housings 164 in their collapsed states added with the height of strip 162. FIG. 88 shows a front view of two-housing assembly 110. FIG. 89 shows a side view of two-housing assembly 110 with housings 164 attached to each other by respective outer surfaces and with strip 162 permanently or temporarily attached to the outer surface of one of housings 164.

Figure 90:
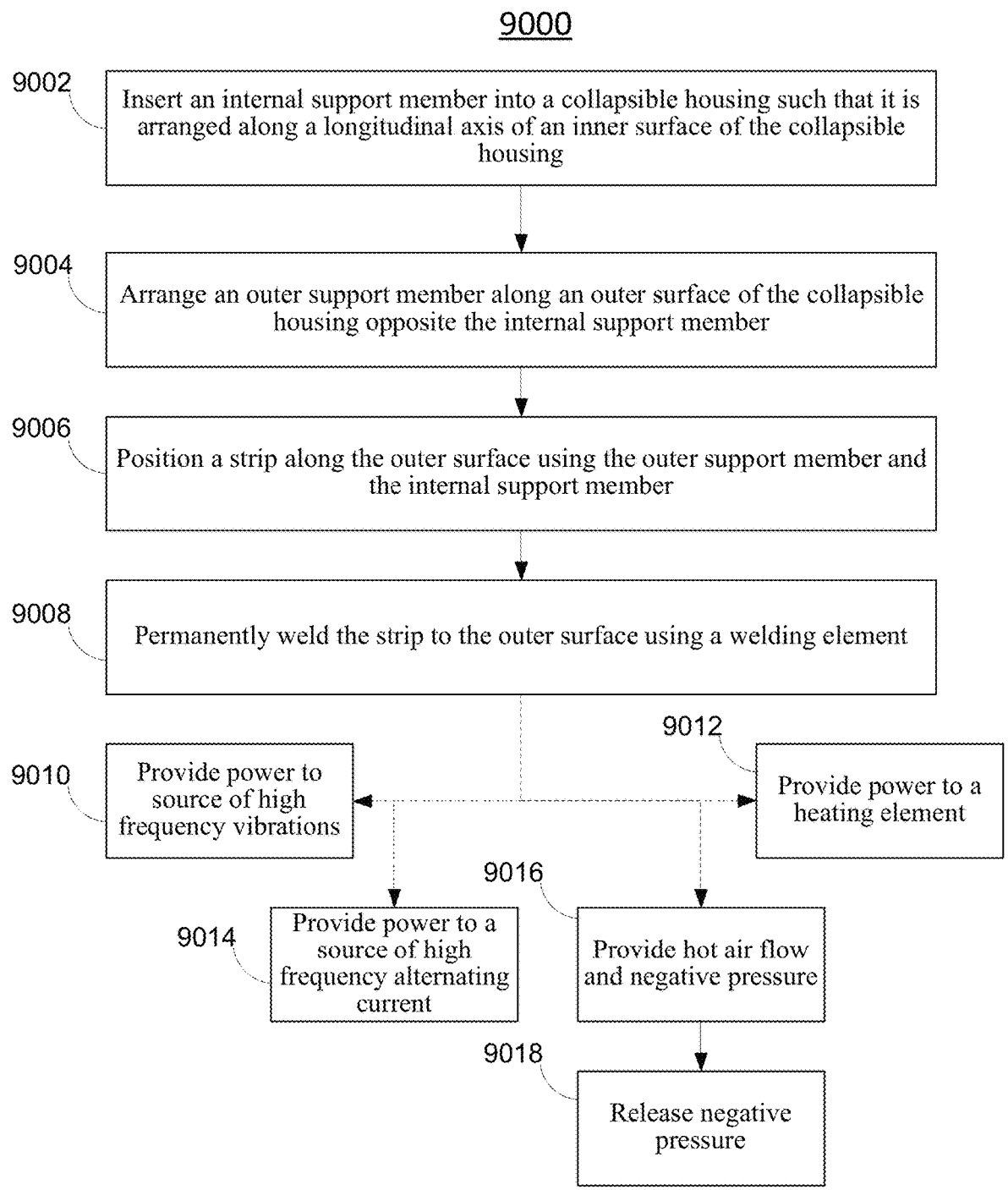
FIG. 90 is a flowchart of an illustrative process for attaching a strip to a housing, according to some embodiments of the present disclosure.

FIG. 90 depicts a flowchart of an illustrative process 9000 for attaching a strip to a housing, according to some embodiments of the present disclosure.

At 9002, an internal support member may be inserted into a collapsible housing such that it is arranged along a longitudinal axis of an inner surface of the collapsible housing. For example, internal support member 6 may be inserted into housing 2. In another example, internal support member 26 may be inserted into housing 2. In another example, internal support member 48 may be inserted into housing 2. In a further example, internal support member 72 may be inserted into housing 2. In some embodiments, the insertion may be performed manually. In some embodiments, the insertion may be performed automatically.

At 9004, an outer support member may be arranged along an outer surface the collapsible housing opposite the internal support member. For example, outside support member including horn 8 may be positioned opposite the internal support member 6. In another example, outer support member 22 may be positioned opposite the internal support member 26. In another example, outer support member 42 may be positioned opposite the internal support member 48. In a further example, outer support member 76 may be positioned opposite the internal support member 72. In some embodiments, the arrangement may be performed manually. In some embodiments, the arrangement may be performed automatically.

At 9006, the outer support member (e.g., outer support members 8, 22, 42, 76) and the internal support member (e.g., one of the internal support members 6, 26, 48, and 72) are configured to position a strip along the outer surface. In some embodiments, the positioning may be performed manually. In some embodiments, the positioning may be performed automatically.

At 9008, a welding element may be activated to permanently weld the strip to the outer surface. The welding may be performed using one of the ways described in steps 9010, 9012, 9014, and 9016-9018.

At 9010, the welding may be accomplished using high-frequency vibration. For example, power may be provided to ultrasonic sealing horn 8. At 9012, the welding may be accomplished using a heating element. For example, power may be provided to one or more heating elements 24 and 28. At 9014, the welding may be accomplished using high-frequency alternating current, for example, energy may be provided to one of transducers 52 and 44. At 9016-9018, the welding may be accomplished using hot airflow. For example, at 9016, hot air may be provided to hot air inlet 82, while negative pressure is provided to keep the strip slightly away from the outer surface of the housing. At 9018, the negative pressure is removed, and the melted strip is pushed into the outer surface of the housing to complete the weld.

The processes, systems, methods, and products discussed above are intended to be illustrative and not limiting. One skilled in the art would appreciate that the steps of the processes discussed herein may be omitted, modified, combined, and/or rearranged, and any additional steps may be performed without departing from the scope of this disclosure. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and examples relating to one embodiment may be combined with any other embodiment in a suitable manner, done in different orders, or done in parallel. It should also be noted, the systems and/or methods described above may be applied to, or used in accordance with, other systems and/or methods.

While some portions of this disclosure may refer to "convention," any such reference is merely to provide context to the instant disclosure and does not form any admission as to what constitutes the state of the art.

What is claimed is:

1. A system comprising:
    an internal support member inserted into a collapsible housing and arranged along a longitudinal axis of the collapsible housing;
    an outer support member arranged along an outer surface of the collapsible housing opposite the internal support member, wherein:
        the internal support member and the outer support member position a strip along the outer surface, wherein the internal support member comprises a monolithic structure that contacts opposing sides of an internal surface of the collapsible housing, an upper portion to support the collapsible housing, and a lower portion, wherein a widest width of the upper portion is larger than a widest width of the lower portion, and
        at least one of the internal support member or the outer support member comprises a welding element to weld the strip to the outer surface.

2. The system of claim 1, wherein:
    the outer support member comprises the welding element; and
    the welding element is configured to permanently weld the strip to the outer surface using high frequency vibrations.

3. The system of claim 1, wherein:
    the outer support member comprises the welding element;
    the welding element comprises a heating element; and
    the welding element is configured to permanently weld the strip to the outer surface by using the heating element to partially melt the strip and a wall of the collapsible housing.

4. The system of claim 1, wherein:
    the outer support member comprises the welding element; and
    the welding element is configured to permanently weld the strip to the outer surface using high frequency alternating current.

5. The system of claim 1, wherein:
    the outer support member comprises the welding element;
    the welding element comprises an air pathway for high temperature air; and
    the welding element is configured to permanently weld the strip to the outer surface using the high temperature air.

6. The system of claim 1, wherein the internal support member and the outer support member are configured to apply opposing forces to the strip and to the collapsible housing.

7. The system of claim 1, wherein the outer support member comprises a feature for positioning the strip in a position in which the strip will remain during welding, and wherein the feature of the outer support member for positioning the strip comprises a depression in the outer support member that engages with the strip.

8. The system of claim 1, wherein the upper portion of the internal support member is curved to match the curvature of the collapsible housing.

* * * * *